US010657519B2

(12) United States Patent
Somani et al.

(10) Patent No.: US 10,657,519 B2
(45) Date of Patent: May 19, 2020

(54) FACILITATING SECURE TRANSACTIONS USING A CONTACTLESS INTERFACE

(71) Applicant: Accenture Global Services Limited, Dublin (IE)

(72) Inventors: Avishek Somani, Mississauga (CA); Sunil Raina, Issaquah, WA (US); Michael Jennings, San Antonio, TX (US)

(73) Assignee: Accenture Global Services Limited, Dublin (IE)

( * ) Notice: Subject to any disclaimer, the term of this patent is extended or adjusted under 35 U.S.C. 154(b) by 657 days.

(21) Appl. No.: 14/777,911

(22) PCT Filed: Oct. 21, 2014

(86) PCT No.: PCT/US2014/061629
§ 371 (c)(1),
(2) Date: Sep. 17, 2015

(87) PCT Pub. No.: WO2015/061354
PCT Pub. Date: Apr. 30, 2015

(65) Prior Publication Data
US 2016/0267469 A1  Sep. 15, 2016

Related U.S. Application Data

(60) Provisional application No. 61/894,387, filed on Oct. 22, 2013.

(51) Int. Cl.
*G06Q 20/34* (2012.01)
*G06Q 20/32* (2012.01)
(Continued)

(52) U.S. Cl.
CPC ......... *G06Q 20/352* (2013.01); *G06Q 20/105* (2013.01); *G06Q 20/3224* (2013.01); *G06Q 20/3278* (2013.01); *G07F 7/0893* (2013.01)

(58) Field of Classification Search
CPC ............... G06Q 20/352; G06Q 20/105; G06Q 20/3224; G06Q 20/3278; G07F 7/0893
See application file for complete search history.

(56) References Cited

U.S. PATENT DOCUMENTS 6,931,528 B1 * 8/2005 Immonen ............... H04W 12/06
713/151
7,496,347 B2 * 2/2009 Puranik ................. H04L 9/0838
455/410
(Continued)

FOREIGN PATENT DOCUMENTS

GB          2476989 A        7/2011

OTHER PUBLICATIONS

Wikipedia, "Calypso (electronic ticketing system)," https://en.wikipedia.org/wiki/Calypso_(electronic_ticketing_system), Mar. 11, 2015, 2 pages.
(Continued)

*Primary Examiner* — Patrick McAtee
*Assistant Examiner* — Timothy Paul Sax
(74) *Attorney, Agent, or Firm* — Harrity & Harrity, LLP

(57) ABSTRACT

A device may perform a first authentication operation, associated with a contactless media device, using a first key. The first key may permit a security mode of the contactless media device to be modified. The device may cause the contactless media device to set the security mode to a first security mode that causes the contactless media device to secure at least one transmission from the contactless media device. The device may perform a second authentication operation, associated with the contactless media device, using a second key that permits information to be read from or written to the contactless media device. The device may read first secured information from or write second secured information to the contactless media device. The first secured information or the second secured information may
(Continued)

be secured based on the security mode of the contactless media device being set to the first security mode.

20 Claims, 17 Drawing Sheets

(51) Int. Cl.
*G07F 7/08* (2006.01)
*G06Q 20/10* (2012.01)

(56) References Cited

U.S. PATENT DOCUMENTS

| | | | | |
|---|---|---|---|---|
| 8,166,118 | B1* | 4/2012 | Borghetti | H04L 51/12 |
| | | | | 707/922 |
| 2003/0115371 | A1* | 6/2003 | Kang | G06Q 20/341 |
| | | | | 719/310 |
| 2004/0127256 | A1* | 7/2004 | Goldthwaite | G06K 7/0004 |
| | | | | 455/558 |
| 2005/0198522 | A1* | 9/2005 | Shaw | G06F 21/606 |
| | | | | 726/22 |
| 2006/0213972 | A1* | 9/2006 | Kelley | G06K 7/0008 |
| | | | | 235/380 |
| 2007/0178938 | A1* | 8/2007 | Kravitz | H04M 3/387 |
| | | | | 455/558 |
| 2008/0010455 | A1* | 1/2008 | Holtzman | H04L 9/3228 |
| | | | | 713/168 |
| 2011/0166914 | A1* | 7/2011 | Dixon | G06Q 20/045 |
| | | | | 705/13 |
| 2011/0307709 | A1* | 12/2011 | Cox | G06F 21/79 |
| | | | | 713/183 |
| 2012/0064828 | A1* | 3/2012 | Khan | H04W 12/0609 |
| | | | | 455/41.1 |
| 2013/0311768 | A1* | 11/2013 | Fosmark | G06Q 20/3223 |
| | | | | 713/155 |
| 2014/0214688 | A1* | 7/2014 | Weiner | G06Q 20/3227 |
| | | | | 705/71 |
| 2015/0262170 | A1* | 9/2015 | Bouda | G06F 21/44 |
| | | | | 705/67 |

OTHER PUBLICATIONS

Wikipedia, "MIFARE," https://en.wikipedia.org/wiki/MIFARE, Jun. 2, 2015, 21 pages.
NXP "Designed for high-security smart card applications requiring highly reliable solutions," http://www.nxp.com/products/identification_and_security/smart_card_ics/smartmx_contact_interface_controllers/, Oct. 16, 2012, 2 pages.
Wikipedia, "Snapper card," https://en.wikipedia.org/wiki/Snapper_card, Jun. 2, 2015, 3 pages.
Wikipedia, "Contactless smart card," https://en.wikipedia.org/wiki/Contactless_smart_card, Jun. 22, 2015, 7 pages.
International Search Report and Written Opinion corresponding to PCT/US2014/061629, dated Jan. 29, 2015, 11 pages.

* cited by examiner

FACILITATING SECURE TRANSACTIONS USING A CONTACTLESS INTERFACE

RELATED APPLICATION

This application claims priority under 35 U.S.C. § 119 to U.S. Provisional Patent Application No. 61/894,387, filed on Oct. 22, 2013, the content of which is incorporated by reference herein in its entirety.

BACKGROUND

A contactless media device may refer to a device with embedded integrated circuits that can process and store data, and that can communicate with a terminal (e.g., via radio waves). For example, a contactless media device may include a contactless smart card, a contactless fare card, a near field communications (NFC) device, or the like. A contactless media device may include a re-writeable microchip that can be read from and/or written to using radio waves.

SUMMARY

According to some possible implementations, a device or apparatus may include one or more processors to perform a first authentication operation, associated with a contactless media device, using a security mode key. The one or more processors may provide an instruction to cause the contactless media device to set a security mode to a first security mode based on performing the first authentication operation. The one or more processors may perform a second authentication operation, associated with the contactless media device, using a transaction key. The transaction key may be different from the security mode key. The one or more processors may read first secured information from or write second secured information to the contactless media device based on performing the second authentication operation. The first secured information or the second secured information may be secured based on the security mode of the contactless media device being set to the first security mode. The one or more processors may validate that the first secured information has been read from the contactless media device or that the second secured information has been written to the contactless media device. The one or more processors may provide an instruction to cause the contactless media device to set the security mode to a second security mode based on the validating.

According to some possible implementations, a computer-readable medium may store one or more instructions that, when executed by a processor, cause the processor to perform a first authentication operation, associated with a contactless media device, using a first key. The first key may permit a security mode of the contactless media device to be modified. The one or more instructions may cause the processor to provide an instruction to cause the contactless media device to set the security mode to a first security mode based on performing the first authentication operation. The first security mode may cause the contactless media device to secure at least one transmission from the contactless media device. The one or more instructions may cause the processor to perform a second authentication operation, associated with the contactless media device, using a second key. The second key may permit information to be read from or written to the contactless media device. The one or more instructions may cause the processor to read first secured information from or write second secured information to the contactless media device based on performing the second authentication operation. The first secured information or the second secured information may be secured based on the security mode of the contactless media device being set to the first security mode.

According to some possible implementations, a method may include performing, by a first device, a first authentication operation, associated with a contactless media device, using a first key. The first key may permit a security mode of the contactless media device to be modified. The method may include providing, by the first device, an instruction to cause the contactless media device to set the security mode to a first security mode based on performing the first authentication operation. The first security mode may cause the contactless media device to secure at least one transmission from the contactless media device. The method may include performing, by the first device, a second authentication operation, associated with the contactless media device, using a second key. The second key may permit the first device to read from or write to the contactless media device. The method may include reading or writing, by the first device, secured information from or to the contactless media device based on performing the second authentication operation. The secured information may be secured based on the security mode of the contactless media device being set to the first security mode.

DETAILED DESCRIPTION

The following detailed description of example implementations refers to the accompanying drawings. The same reference numbers in different drawings may identify the same or similar elements.

A contactless media device (e.g., a contactless smart card, a contactless fare card, a contactless security card, a mobile wallet, a secure element based mobile wallet, etc.) may be capable of communicating in different security modes, such as a high security mode and a low security mode. In the high security mode, communications to and/or from the contactless media device may be encrypted, encoded, or the like. In the low security mode, communications to and/or from the contactless media device may be unencrypted, unencoded, or the like (e.g., may be in plaintext). When a transaction system operator controls an interface device (e.g., a fare card terminal, a fare card kiosk, etc.) that communicates with the contactless media device, the devices may authenticate one another in a high security mode, and then may communicate using a low security mode.

However, some interface devices are not controlled by a system operator, and are less secure. For example, a mobile device (e.g., a smart phone) may be capable of communicating with the contactless media device (e.g., via a near-field communication (NFC) interface). A user of an interface device may want to be able to use the interface device to communicate with the contactless media device. This may introduce increased security risks that subject the contactless media device, or a transaction system associated with the contactless media device, vulnerable to attacks, such as relay attacks or man-in-the-middle attacks (e.g., if the interface device is lost or stolen, if a third party device is used to intercept communications with the interface device and/or the contactless media device, etc.). Implementations described herein facilitate secure communications between contactless media devices and interface devices.

Figure 1:
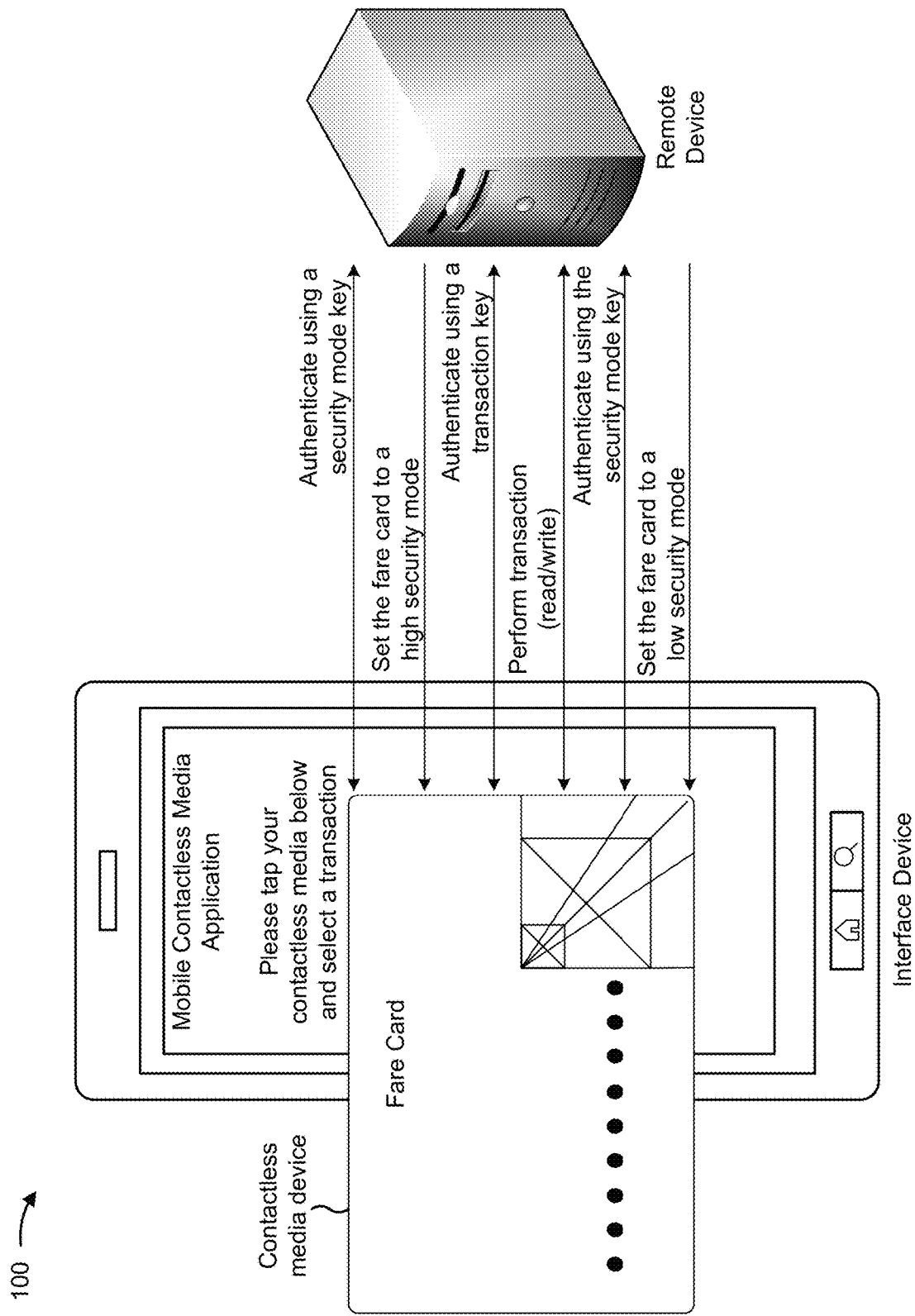
FIG. 1 is a diagram of an overview of an example implementation described herein.

FIG. 1 is a diagram of an overview of an example implementation 100 described herein. As shown in FIG. 1, an interface device, such as a smart phone, may execute a mobile contactless media application that permits a user to transact with a contactless media device, such as a fare card. For example, the interface device may include an NFC interface that permits the interface device to communicate with the contactless media device, such as when the user brings the contactless media device within communicative proximity of the interface device (e.g., by tapping the fare card on the smart phone). As shown, the user may interact with the interface device to identify a transaction to be performed in association with the contactless media device.

The interface device may act as an interface between the contactless media device and a remote device used to read information from and/or write information to the contactless media device. As shown, the contactless media device and the remote device may communicate, via the interface device, to authenticate one another using a security mode key. After successful authentication, the remote device (or the interface device, in some implementations) may set the contactless media device to a high security mode. While in the high security mode communications between the contactless media device and the remote device may be secured via encryption, encoding, or the like.

As further shown, the contactless media device and the remote device may further authenticate one another using a transaction key. After successful authentication, the remote device, via the interface device, may read information from and/or write information to the contactless media device. For example, when the contactless media device is a fare card or a similar device, the remote device may read a card balance, may update a card balance, may add, remove, or modify a transit pass associated with the fare card, may modify a user profile associated with the fare card, may read a transaction history associated with the fare card, or the like. The remote device may provide information read from the contactless media device to the interface device for display, or may write information to the contactless media device based on input received from the interface device.

The above transactions may take place using secure communications (e.g., in the high security mode). When the transactions have been completed, the contactless media device and the remote device may again communicate, via the interface device, to authenticate one another using the security mode key. After successful authentication, the remote device (or the interface device, in some implementations) may set the contactless media device to a low security mode to permit communication with other devices. In this way, communications between contactless media devices and interface devices may be made more secure.

Figure 2:
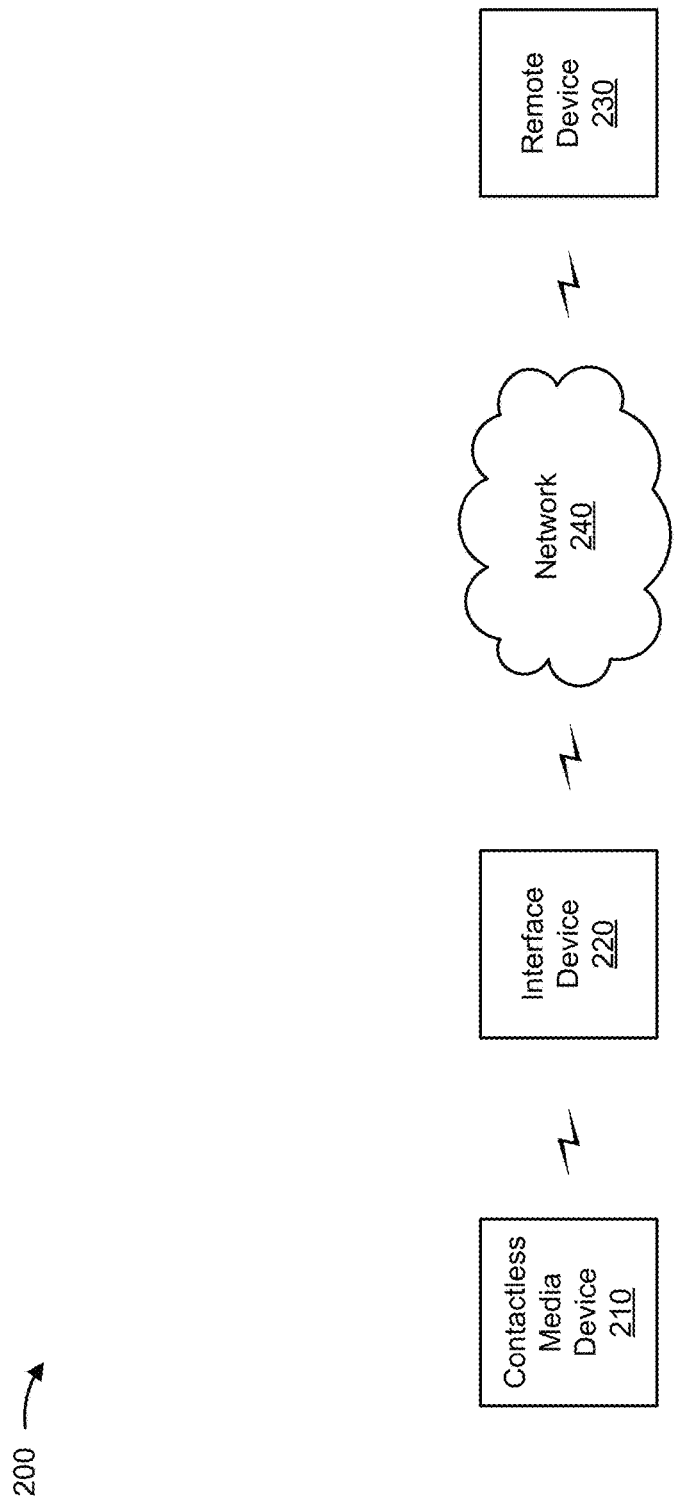
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a contactless media device 210, an interface device 220, a remote device 230, and a network 240. Devices of environment 200 may interconnect via wired connections, wireless connections, or a combination of wired and wireless connections.

Contactless media device 210 may include one or more devices capable of receiving, storing, and/or providing card information associated with a contactless media system, and/or capable of communicating card information using multiple security modes. For example, contactless media device 210 may include a smart card (e.g., a contactless smart card, a reloadable smart card, a reprogrammable smart card, etc.), a chip card, an integrated circuit card, an identification card, a proximity card, an access card, a contactless card, a radio-frequency identification (RFID) card, a limited use media, a mobile device (e.g., a mobile device executing a fare card application, such as a mobile wallet; a mobile device with data stored in secure element storage; etc.), a memory card (e.g., a nonvolatile memory card, a secure digital card, a subscriber identity module (SIM) card with secure element storage, a micro SD card with secure element storage, etc.), a sensor, a near-field communication (NFC) device (e.g., an NFC tag, a Bluetooth tag, a Bluetooth low energy tag, a Bluetooth 4.0 device, a sensor sticker, etc.), a wearable device, a wireless key fob, or the like. As another example, contactless media device 210 may include a MiFARE contactless card, such as MiFARE Desfire, MiFARE Desfire EV1, and MiFARE Desfire EV2, or the like.

Contactless media device 210 may store card information, such as a card balance stored by contactless media device 210 or a credential stored by contactless media device 210 (e.g., a credential used to access a card balance via a back office server device). Interface device 220 and/or remote device 230 may interact with contactless media device 210 to read and/or write the card information stored by contactless media device 210. Contactless media device 210 may be capable of communicating using multiple security modes, such as a high security mode (e.g., an encrypted mode, a symmetrically encrypted mode, an asymmetrically encrypted mode, an encoded mode, a ciphertext mode, etc.) and a low security mode (e.g., an unencrypted mode, an unencoded mode, a plaintext mode, etc.). Contactless media device 210 may communicate information with other devices by applying different security protocols (e.g., encryption, symmetric encryption, asymmetric encryption, encoding, message authentication coding (MAC), etc.) based on the security mode.

Interface device 220 may include one or more devices capable of reading card information from contactless media device 210 and/or writing card information to contactless media device 210. For example, interface device 220 may include a mobile phone (e.g., a smart phone), a tablet computer, a handheld inspection device, a contactless smart card reader, a fare card terminal, a fare card vending machine, a fare box, a ticket machine, a station device (e.g., that interacts with a turnstile or a fare gate), a turnstile, a fare gate, a card reader, a card writer, a card query device (e.g., used to check a card balance), a kiosk (e.g., a self-service kiosk), an inspection device (e.g., used to check whether a passenger paid a fare), a point-of-sale device, a fare transaction processor, a wearable device, a smart watch, or the like. Interface device 220 may be configured to read card information from and/or write card information to contactless media device 210 in communicative proximity (e.g., within a particular range, such as a few centimeters, ten meters, etc.) of interface device 220.

Interface device 220 may include a contactless interface (e.g., an NFC interface, an RFID interface, etc.) for communicating with contactless media device 210. Additionally, or alternatively, contactless media device 210 may be housed within interface device 220, such as when contactless media device 210 is a memory card, an NFC device, or the like. In some implementations, interface device 220 may include secure key storage memory, which may store one or more authentication keys (e.g., a security mode key, a transaction key, etc.) in a secure memory location. In some implementations, an authentication key may be generated from a master key associated with a particular contactless media device 210 (e.g., based on a device identifier, serial number, memory signature, etc. associated with contactless media device 210). In this way, a transaction system may not be compromised if an attacker learns the authentication key, as the authentication key may only work with the particular contactless media device 210 with which the authentication key is associated.

Remote device 230 may include one or more devices capable of receiving, generating, storing, process, and/or providing card information associated with contactless media device 210. For example, remote device 230 may include a computing device, such as a server (e.g., an application server, a transaction server, an authentication server, etc.), a desktop computer, a laptop computer, or the like. Remote device 230 may communicate with contactless media device 210 via interface device 220. In some implementations, remote device 230 may include secure key storage memory, which may store one or more authentication keys (e.g., a security mode key, a transaction key, etc.) in a secure memory location. Additionally, or alternatively, remote device 230 may be located in a cloud-based environment.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
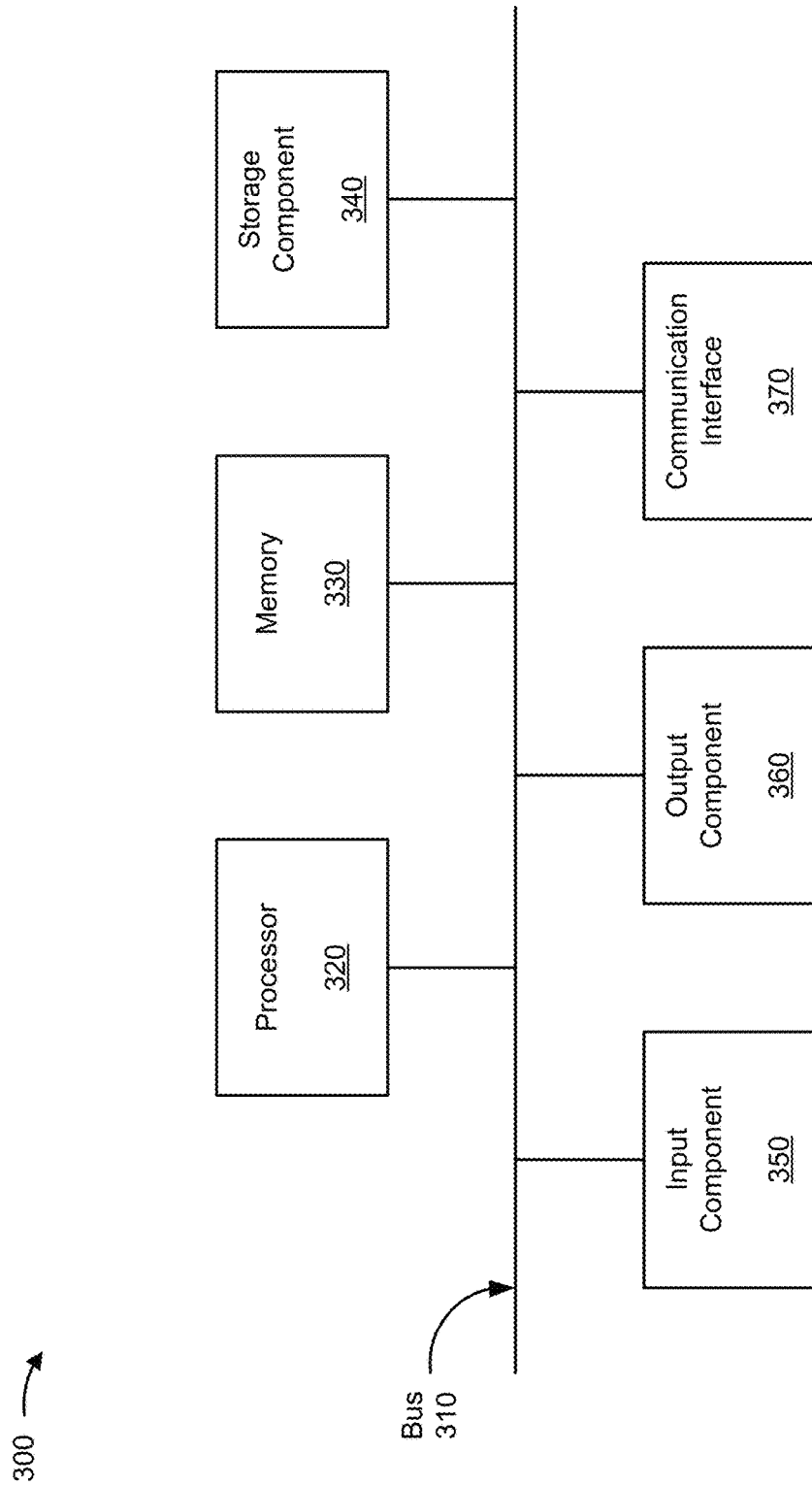
FIG. 3 is a diagram of example components of one or more devices of FIG. 2.

FIG. 3 is a diagram of example components of a device 300. Device 300 may correspond to contactless media device 210, interface device 220, and/or remote device 230. In some implementations, contactless media device 210, interface device 220, and/or remote device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320. In some implementations, memory 330 may include secure key storage memory to store one or more authentication keys in a secure memory location Storage component 340 may store information and/or software related to the operation and use of device 300. For example, storage component 340 may include a hard disk (e.g., a magnetic disk, an optical disk, a magneto-optic disk, etc.), a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may include secure key storage memory to store one or more authentication keys in a secure memory location Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, an NFC interface (e.g., a Bluetooth interface, a Bluetooth low energy interface, etc.), an ultrasonic interface, a Wi-Fi interface, a cellular network interface, or the like. In some implementations, communication interface 370 may include a contactless interface for wireless communication with another device.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. In some implementations, the computer-readable medium may include a computer program product. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
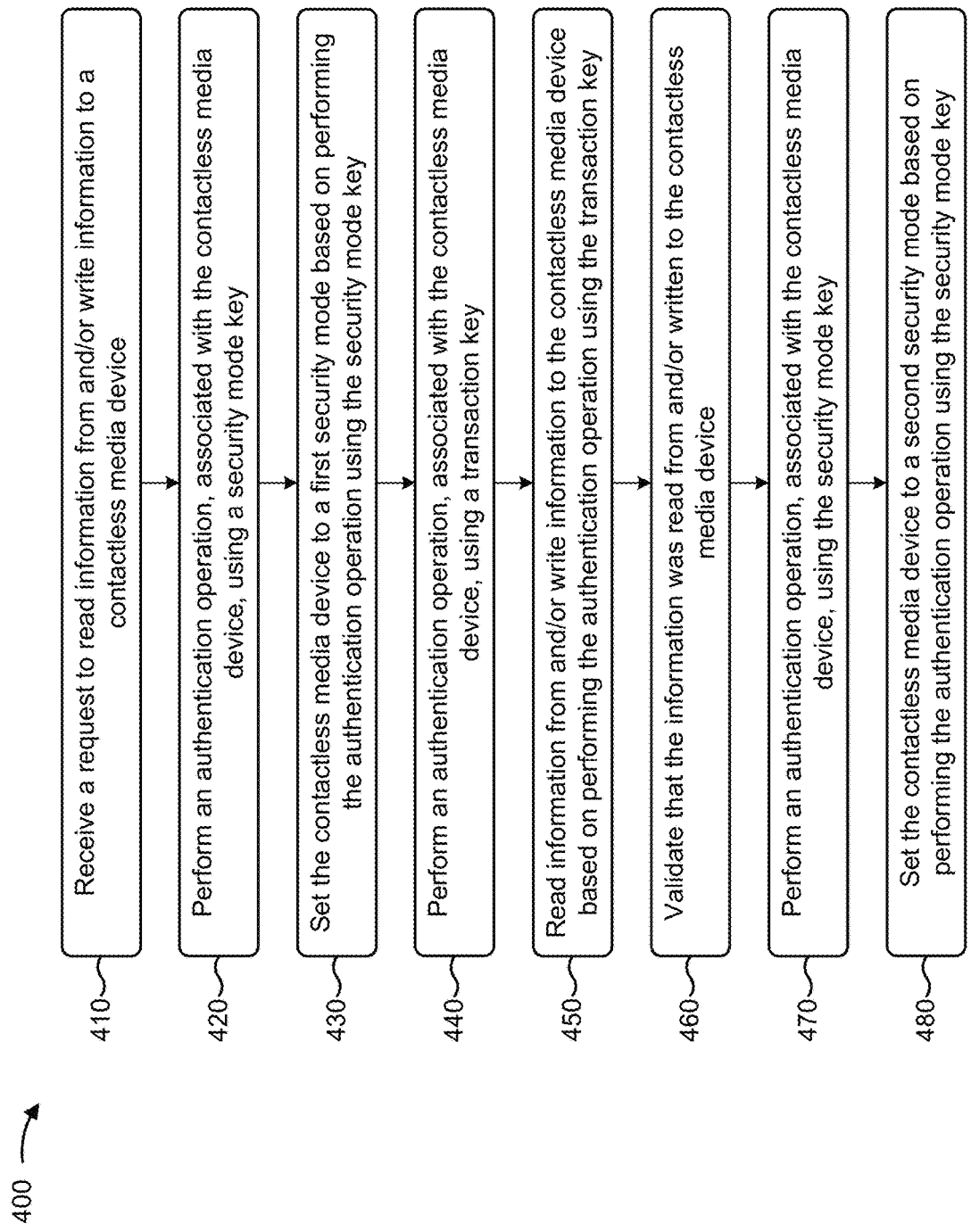
FIG. 4 is a flow chart of an example process for facilitating secure transactions using a contactless interface.

FIG. 4 is a flow chart of an example process 400 for facilitating secure transactions using a contactless interface. In some implementations, one or more process blocks of FIG. 4 may be performed by remote device 230. In some implementations, one or more process blocks of FIG. 4 may be performed by another device or a group of devices separate from or including remote device 230, such as contactless media device 210 and/or interface device 220.

As shown in FIG. 4, process 400 may include receiving a request to read information from and/or write information to a contactless media device (block 410). For example, remote device 230 may receive a request to read card information from and/or write card information to contactless media device 210. In some implementations, remote device 230 may receive the request from interface device 220. For example, a user may interact with interface device 220 (e.g., via a contactless media application executing on interface device 220) to provide input that causes the request to be sent to remote device 230.

In some implementations, the request may be associated with a fare system. For example, contactless media device 210 may include a fare card or a similar device, and the request may include a request to view a card balance stored by the fare card, to modify the card balance stored by the fare card (e.g., by adding, removing, or modifying funds associated with the fare card), to modify transit pass information stored by the fare card (e.g., by adding, removing, or changing a transit pass), to modify user profile information stored by the fare card (e.g., by adding, removing, or changing user profile information), to view a transaction history associated with the fare card, or the like.

Additionally, or alternatively, the request may be associated with an access system. For example, contactless media device 210 may include an access card or a similar device, and the request may include a request to modify access permissions (e.g., by adding, removing, or changing access permissions), to modify user profile information stored by the access card (e.g., by adding, removing, or changing user profile information), or the like.

In some implementations, the request may identify contactless media device 210 associated with the request. For example, the user may bring contactless media device 210 within communicative proximity of interface device 220 (e.g., by tapping contactless media device 210 on or near interface device 220, by bringing contactless media device 210 within an NFC range of interface device 220, etc.), and interface device 220 may determine a device identifier that identifies contactless media device 210 (e.g., a card number, an account number, a serial number, etc.). Interface device 220 may provide the device identifier to remote device 230. In some implementations, the user may not need to bring contactless media device 210 within communicative proximity of interface device 220 because interface 220 emulates contactless media device 210. In this case, interface device 220 may store card information described elsewhere herein as being stored by contactless media device 210.

As further shown in FIG. 4, process 400 may include performing an authentication operation, associated with the contactless media device, using a security mode key (block 420). For example, remote device 230 and contactless media device 210 may communicate, via interface device 220, to perform an authentication operation. Additionally, or alternatively, interface device 220 and contactless media device 210 may communicate to perform the authentication operation (without remote device 230). The authentication operation may be performed to authenticate the devices to one another before changing a security mode of contactless media device 210. For example, the authentication operation may be performed using an authentication protocol, such as key authentication, challenge-response authentication, or the like.

In some implementations, remote device 230 (and/or interface device 220) and contactless media device 210 may exchange one or more security mode keys to authenticate one another. For example, the authentication operation may include an exchange of symmetric cryptographic keys, an exchange of asymmetric keys (e.g., via public-key cryptography, where each device uses a private key to decrypt the public key), or the like.

In some implementations, the authentication operation may include remote device 230 sending a request to authenticate to contactless media device 210 using a particular dedicated key (e.g., identified by a key number, a string of characters, etc.). The dedicated key may be unique to a particular contactless media device 210, in some implementations. Remote device 230 may receive, from contactless media device 210, a first random value (RNDA) encrypted using the dedicated key. Remote device 230 may decrypt the encrypted first random value using, for example, a shared key or a private key. In some implementations, remote device 230 may use the same dedicated key as contactless media device 210, and may determine the dedicated key by performing a mathematical operation on a device identifier and/or a master key associated with contactless media device 210.

In some implementations, remote device 230 may perform a mathematical operation (e.g., a bit shifting operation) on the first random value to obtain a changed first random value (RNDA'). Remote device 230 may combine (e.g., by appending, concatenating, combining mathematically, etc.) the changed first random value (RNDA') and a second random value (RNDB), generated by remote device 230, to form a third random value (e.g., RNDA'+RNDB). Remote device 230 may encrypt the third random value, and may transmit the third random value to contactless media device 210 (e.g., via interface device 220). Contactless media device 210 may decrypt the third random value (e.g., using a key) to verify whether remote device 230 has successfully decrypted the first random value, thus authenticating remote device 230 to contactless media device 210. For example, contactless media device 210 may separate the third random value into the changed first random value (RNDA') and the second random value (RNDB) (e.g., by performing a reverse mathematical operation of the mathematical operation performed by remote device 230 to generate the third random value). Contactless media device 210 may perform a reverse mathematical operation as remote device 230 to convert the changed first random value (RNDA') to the first random value (RNDA) to verify whether this first random value matches the first random value originally sent by contactless media device 210 to remote device 230.

Additionally, or alternatively, contactless media device 210 may perform a mathematical operation on the second random value (RNDB), received from remote device 230, to generate a modified second random value (RNDB'). Contactless media device 210 may encrypt the modified second random value, using the security mode key, and may transmit the encrypted and modified second random value to remote device 230 (e.g., via local device 210). Remote device 230 may decrypt the modified second random value to verify whether contactless media device 210 has successfully decrypted the second random value, thus authenticating contactless media device 210 to remote device 230. In some implementations, contactless media device 210 and remote device 230 may use the first random value, the second random value, a value determined by performing a mathematical operation using the first random value and/or the second random value, or the like, as a session key for a communication session between the devices (e.g., a communication session for setting a security mode of contactless media device 210). In some implementations, a new session key may be used for each communication session.

In some implementations, a separate authentication may be performed for different operations associated with an application (e.g., a fare card application, an access card application, etc.) stored by contactless media device 210, including reading information associated with an application, changing one or more keys of an application (e.g., an application stored by contactless media device 210, a storage sector or block of contactless media device 210, all or a portion of information stored by contactless media device 210, etc.), creating and deleting files within the application, changing access rights for an application, accessing data files of the application, or the like. Additionally, or alternatively, separate authentication operations may be performed for different applications. The authentication operation may also be performed before gathering information about the applications stored on contactless media device 210, before changing dedicated keys assigned to contactless media device 210, changing settings associated with contactless media device 210, creating or deleting applications, or the like. In some implementations, authentication states can be invalidated by changing the key that was used for reaching the currently valid authentication state, or a failed subsequent authentication.

In some implementations, communication between contactless media device 210 and interface device 220, between contactless media device 210 and remote device 230, and/or between interface device 220 and remote device 230 may be encrypted using different keys (e.g., different session keys). For example, interface device 220 may separately authenticate to and establish secure communication with remote device 230 before secure communication between remote device 230 and contactless media device 210 is permitted. In some implementations, authentication with a particular key (e.g., a security mode key) may permit remote device 230 to change a security mode of contactless media device 210. If authentication fails, remote device 230 may not be permitted to change the security mode.

As further shown in FIG. 4, process 400 may include setting the contactless media device to a first security mode based on performing the authentication operation using the security mode key (block 430). For example, remote device 230 may send an instruction to contactless media device 210 to set a security mode of contactless media device 210. The security mode may control a manner in which transmissions from contactless media device 210 are secured. For example, the security mode may include a high security mode, where contactless media device 210 encrypts (e.g., symmetrically, asymmetrically, etc.), encodes (e.g., using message authentication code), etc., transmissions. As another example, the security mode may include a low security mode, where contactless media device 210 does not encrypt, encode, etc., transmissions. Additionally, or alternatively, the security mode may include one or a combination of encryption types, encoding types, or the like. In some implementations, there may be additional security modes (e.g., a medium security mode that is less secure than the high security mode and more secure than the low security mode).

Additionally, or alternatively, based on an instruction from remote device 230, contactless media device 210 may set a security mode for one or more applications of contactless media device 210 (e.g., an access card application, a transit card application, etc.), for one or more files stored by contactless media device 210, for different access permissions (e.g., read access to information stored by contactless media device 210, write access, read and write access, etc.), or the like. By setting the security mode to high security, remote device 230 may prevent interface device 220 and/or another device (e.g., a third party attacker device) from intercepting and/or decrypting communications between contactless media device 210 and remote device 230.

In some implementations, a secure channel may be used for communications with contactless media device 210. In this case, communications with contactless media device 210 may be transmitted via the secure channel (e.g., to and/or from interface device 220 and/or remote device 230) when contactless media device 210 is in the high security mode. In some implementations, an unsecure channel may be used when contactless media device 210 is in a low security mode, described elsewhere herein. Additionally, or alternatively, the unsecure channel may be used when a connection via the secure channel times out.

As further shown in FIG. 4, process 400 may include performing an authentication operation, associated with the contactless media device, using a transaction key (block 440). For example, remote device 230 and contactless media device 210 may perform an authentication operation, as described elsewhere herein. The authentication operation using the transaction key may be performed in a similar manner as the authentication operation using the security mode key, described above in connection with block 420. Authentication using the security mode key may permit remote device 230 to modify a security mode of contactless media device 210, while authentication using the transaction key may permit remote device 230 to perform a transaction associated with contactless media device 210. A transaction may refer to reading information from and/or writing information to contactless media device 210.

In some implementations, the security mode key and the transaction key may be different keys. Alternatively, the security mode key and the transaction key may be the same key (e.g., a single key may be used to change a security mode of contactless media device 210 and permit a transaction with contactless media device 210). In some implementations, different transactions may be authenticated using different transaction keys. For example, remote device 230 and contactless media device 210 may authenticate one another using a first transaction key when remote device 230 intends to read information from contactless media device 210, may authenticate one another using a second transaction key when remote device 230 intends to write information to contactless media device 210, may authenticate one another using a third transaction key (or both the first and second transaction keys) when remote device 230 intends to read information from and write information to contactless media device 210, or the like.

In some implementations, the transaction key may include different keys for different types of transactions. For example, the transaction key may include a read key when information is being read from contactless media device 210. As another example, the transaction key may include a write key when information is being written to contactless media device 210. As another example, the transaction key may include a read/write key when information is being read from and written to contactless media device 210. Two or more of the read key, the write key, and the read/write key may includes a same key or different keys.

As further shown in FIG. 4, process 400 may include reading information from and/or writing information to the contactless media device based on performing the authentication operation using the transaction key (block 450). For example, remote device 230 may provide an instruction to contactless media device 210 requesting information stored by contactless media device 210, and/or requesting that information be written to contactless media device 210.

As an example, remote device 230 may read a card balance from contactless media device 210, may modify a card balance stored by contactless media device 210 (e.g., may add funds to the card balance), may read a transit pass stored by contactless media device 210, may modify a transit pass stored by contactless media device 210, may change profile information stored by contactless media device 210, may read a transaction history stored by contactless media device 210, may modify a transaction history stored by contactless media device 210, may read access rights stored by contactless media device 210, may modify access rights stored by contactless media device 210, or the like. In some implementations, reading information from contactless media device 210 may be performed by interface device 210, and writing information to contactless media device 210 may be performed by remote device 230.

As further shown in FIG. 4, process 400 may include validating that the information was read from and/or written to the contactless media device (block 460). For example, remote device 230 may verify whether information was successfully read from contactless media device 210 by comparing the information to stored information, by determining whether the information matches a particular format (e.g., a number, a dollar amount, etc.), or the like. In some implementations, remote device 230 may verify whether information was successfully written to contactless media device 210 by requesting that the information be written to contactless media device 210, reading the written information from contactless media device 210, and verifying that the information to be written and the read information match.

As further shown in FIG. 4, process 400 may include performing an authentication operation, associated with the contactless media device, using the security mode key (block 470), and setting the contactless media device to a second security mode based on performing the authentication operation using the security mode key (block 480). For example, remote device 230 and contactless media device 210 may authenticate one another using a security mode key, as described herein in connection with block 420. Based on the authentication, remote device 230 may instruct contactless media device 210 to set a security mode to a different security mode, such as a low security mode (e.g., where transmissions are not encrypted). In this way, remote device 230 may set contactless media device 210 to a high security mode for more sensitive transactions, and may set contactless media device 210 to a low security mode for less sensitive transactions.

In some implementations, the security mode key used to authenticate before setting contactless media device 210 to the high security mode and the security mode key used to authenticate before setting contactless media device 210 to the low security mode may be the same security key. Alternatively, these security mode keys may be different security mode keys.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
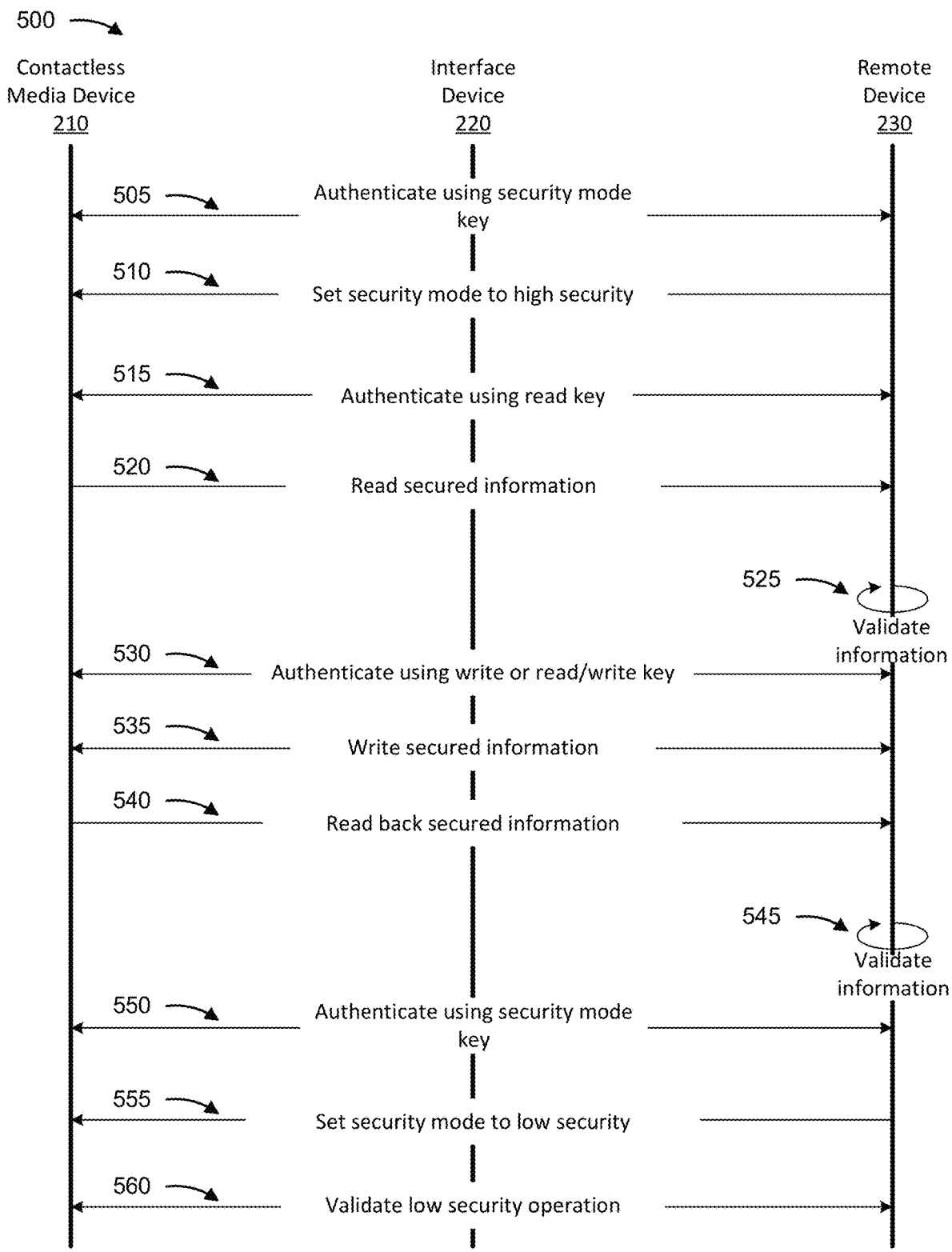
FIG. 5 is a diagram of an example call flow relating to the example process shown in FIG. 4.

FIG. 5 is a diagram of an example call flow 500 relating to example process 400 shown in FIG. 4. FIG. 5 shows an example where remote device 230 authenticates and transacts with contactless media device 210 via interface device 220.

As shown in FIG. 5, call flow 500 may include authenticating using a security mode key (reference number 505). For example, remote device 230 may authenticate contactless media device 210 by communicating with contactless media device 210 over a contactless interface of interface device 220. Remote device 230 and contactless media device 210 may authenticate one another using a security mode key stored in secure key storage of remote device 230. The security mode key may permit remote device 230 to change a security mode of the contactless media device 210 to a high security mode, such as a symmetrically encrypted mode, an asymmetrically encrypted mode, a message authentication coded (MAC) mode, etc. In some implementations, the authentication may involve multiple steps, and may establish the identity of both contactless media device 210 to remote device 230 and remote device 230 to contactless media device 210.

As further shown in FIG. 5, call flow 500 may include setting a security mode of contactless media device 210 to a high security mode (reference number 510). For example, following authentication of remote device 230 and contactless media device 210, remote device 230 may instruct contactless media device 210 to enter a high security mode of communication. In some implementations, instructions sent from remote device 230 to contactless media device 210 may be transmitted in a high security mode (e.g., encrypted, encoded, etc.), and may be sent to contactless media device 210 via interface device 220 (e.g., via a contactless interface). Additionally, or alternatively, the instructions may be padded, may be transmitted with an error detection code and/or an error-correcting code (e.g., a checksum, a cyclic redundancy check, etc.). When such codes are used, an intruding device or application may be prevented from manipulating the instructions. Additionally, or alternatively, remote device 230 may transmit a commit command to contactless media device 210 to commit any changes.

As further shown in FIG. 5, call flow 500 may include authenticating using a read key (reference number 515), reading secured information (reference number 520), and validating the information (reference number 525). For example, remote device 230 and contactless media device 210 may authenticate one another using a read key (e.g., stored in secure key storage of remote device 230). The authentication may involve multiple steps, and may establish the identity of contactless media device 210 to remote device 230 and remote device 230 to contactless media device 210. Following authentication, remote device 230 may request information to be read from contactless media device 210. Contactless media device 210 may secure the information (e.g., using encryption, etc., and based on being in the high security mode), and may send the secured information to remote device 230 (e.g., via interface device 220). Remote device 230 may determine if the information has been properly secured (e.g., encrypted, encoded, etc.), and may verify that contactless media device 210 is properly operating in the high security mode. Remote device 230 may use the read information, as described in more detail elsewhere herein. Additionally, or alternatively, remote device 230 may transmit a commit command to contactless media device 210 to commit any changes.

As further shown in FIG. 5, call flow 500 may include authenticating using a write or read/write key (reference number 530), writing secured information to contactless media device 210 (reference number 535), reading the secured information back from contactless media device 210 (reference number 540), and validating the information (reference number 545). For example, remote device 230 and contactless media device 210 may authenticate one another. Authentication may be accomplished using a write key and/or a read/write key. Following authentication, remote device 230 may send secured information and a write instruction to interface device 220, which may provide the instruction and/or the secured information to be written to contactless media device 210. Following receipt of the secured information, contactless media device 210 may or may not decrypt or decode the secured information before storing the secured information, depending on the requirements of a particular application associated with the secured information.

The written information may be read back by remote device 230 from contactless media device 210 for verification. For example, remote device 230 may decrypt, decode, etc. the information, and may validate that the information has been properly written to contactless media device 210. In some implementation, interface device 210 may receive the secured information from contactless media device 210, and may generate a hash (e.g., a one-way hash, etc.) of the secured information. Remote device 230 may compare the hash to another hash generated from the secured information transmitted by remote device 230 (e.g., as sent to interface device 220 for transmission to contactless media device 210). In some implementations, remote device 230 may transmit a commit command to contactless media device 210 to commit any changes (e.g., to cause contactless media device 210 to store the changes to memory until a different command is received).

As further shown in FIG. 5, call flow 500 may include authenticating using a security mode key (reference number 550), setting a security mode of contactless media device 210 to low security (reference number 555), and validating low security operation of contactless media device 210 (reference number 560). For example, remote device 230 and contactless media device 210 may authenticate one another using the security mode key. The security mode key may permit remote device 230 to change a security mode of contactless media device 210 back to a low security (e.g., plaintext) mode of communication. Following authentication, remote device 230 may command contactless media device 210 to enter the low security (e.g., normal) mode of communication. In some implementations, remote device 230 may securely transmit the command. Additionally, or alternatively, remote device 230 may validate low security operation of contactless media device 210 by testing a plaintext read from contactless media device 210. In some implementations, remote device 230 may transmit a commit command to contactless media device 210 to commit any changes.

As indicated above, FIG. 5 is provided merely as an example. Other examples are possible and may differ from what was described with regard to FIG. 5. For example, one or more of the above operations may be repeated until a desired result is obtained (e.g., authentication, reading, writing, validating, setting a security mode, etc.).

Figure 6:
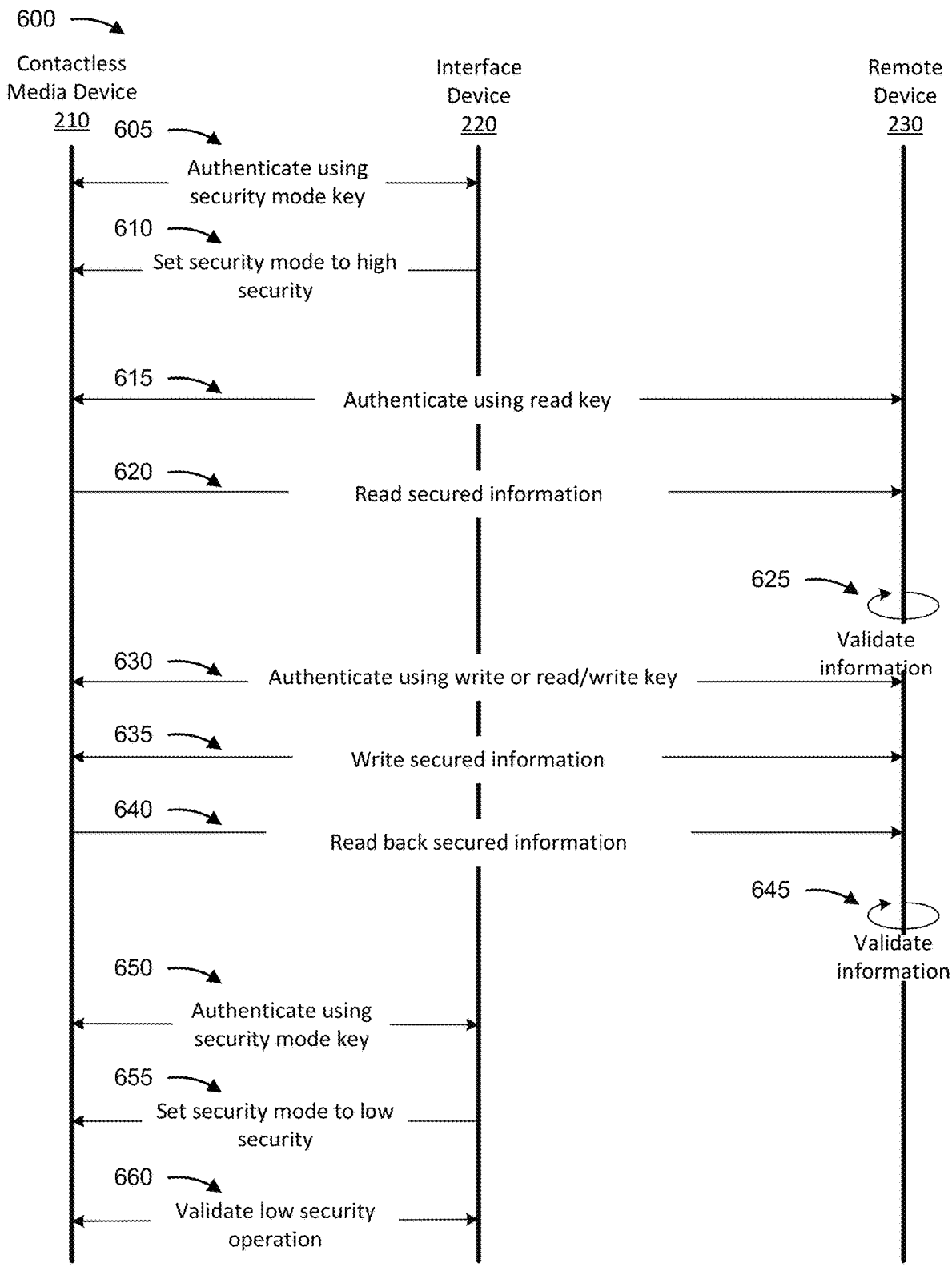
FIG. 6 is a diagram of another example call flow relating to the example process shown in FIG. 4.

FIG. 6 is a diagram of another example call flow 600 relating to example process 400 shown in FIG. 4. FIG. 6 shows an example where interface device 220 sets a security mode of contactless media device 210, and where remote device 230 reads from and writes to contactless media device 210.

As shown in FIG. 6, interface device 220 may perform one or more operations described with respect to FIG. 5 as being performed by remote device 230. For example, and as shown by reference numbers 605 and 610, interface device 220 and contactless media device 210 may authenticate one another using a security mode key, and interface device 220 may instruct contactless media device 210 to modify a security mode from low security to high security.

As shown by reference numbers 615-645, remote device 230 and contactless media device 210 may authenticate using a read key, a write key, and/or a read/write key, and may perform a transaction based on the authentication (e.g., a read operation, a write operation, etc.). Additionally, or alternatively, remote device 230 may validate information read from and/or written to contactless media device 210. While not shown, interface device 220 may perform one or more of these operations, in some implementations.

As shown by reference numbers 650 and 655, interface device 220 and contactless media device 210 may authenticate one another using a security mode key, and interface device 220 may instruct contactless media device 210 to modify a security mode from high security to low security. As shown by reference number 660, interface device 220 may validate that contactless media device 210 is operating in a low security mode.

As indicated above, FIG. 6 is provided merely as an example. Other examples are possible and may differ from what was described with regard to FIG. 6.

FIGS. 7A-7E are diagrams of an example implementation 700 relating to example process 400 shown in FIG. 4. FIGS. 7A-7E show an example of facilitating secure transactions using a contactless interface.

Figure 7A:
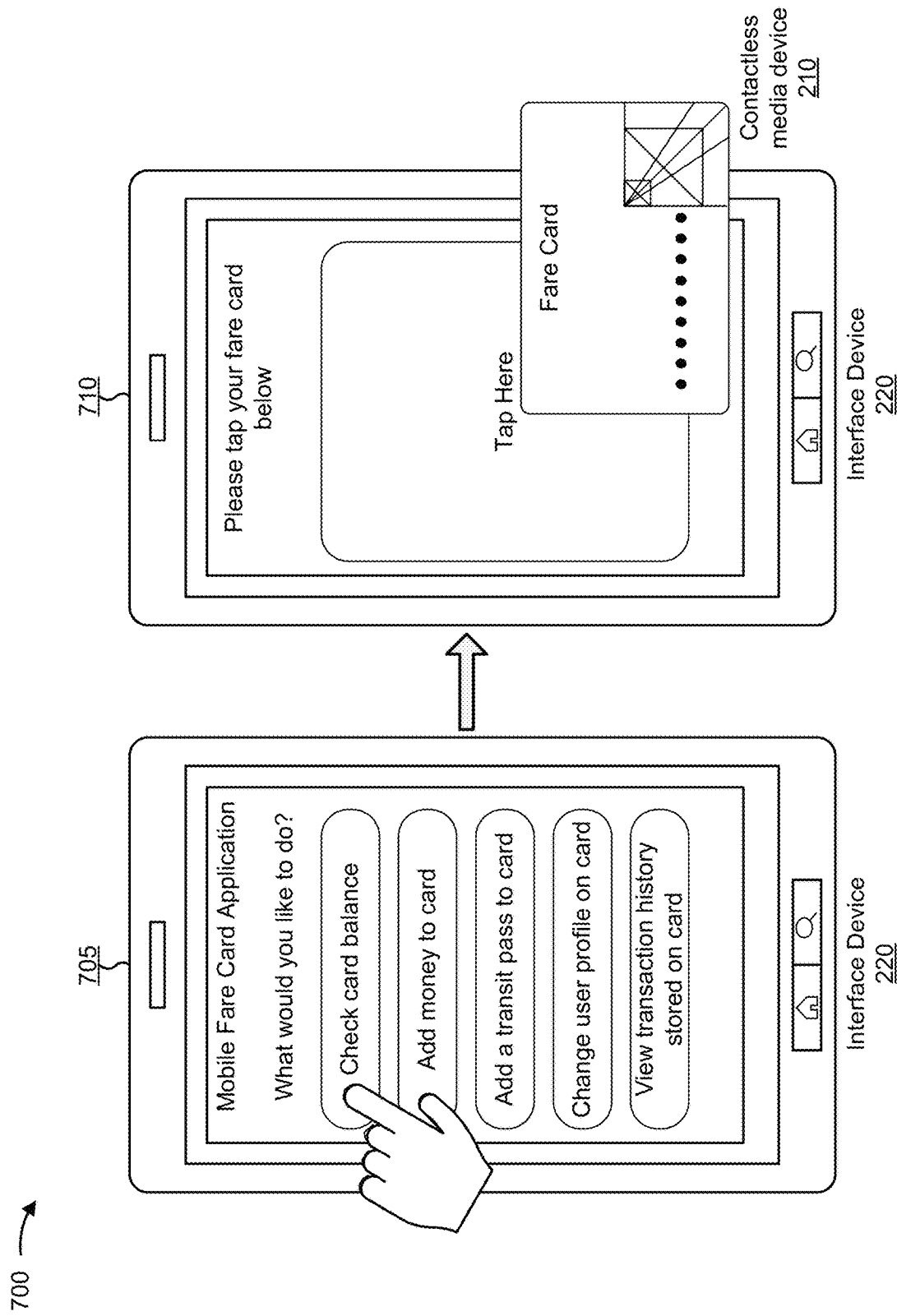
FIGS. 7A-7E are diagrams of an example implementation relating to the example process shown in FIG. 4.

As shown in FIG. 7A, and by reference number 705, assume that a user interacts with interface device 220, shown as a mobile phone. Assume that interface device 220 executes a mobile fare card application that permits the user to perform transactions associated with a fare card (e.g., a contactless media device 210), such as checking a card balance, adding money to the fare card, adding a transit pass to the fare card, changing a user profile stored on the fare card, viewing a transaction history stored on the fare card, or the like. As shown, the user selects to check a card balance. As shown by reference number 710, based on the user selection, assume that the mobile fare card application prompts the user to tap the user's fare card on interface device 220, to bring the fare card within communicative proximity of interface device 220. As shown, assume that the user brings the fare card within communicative proximity of interface device 220, such that the devices are able to communicate (e.g., via an NFC communication session).

Figure 7B:
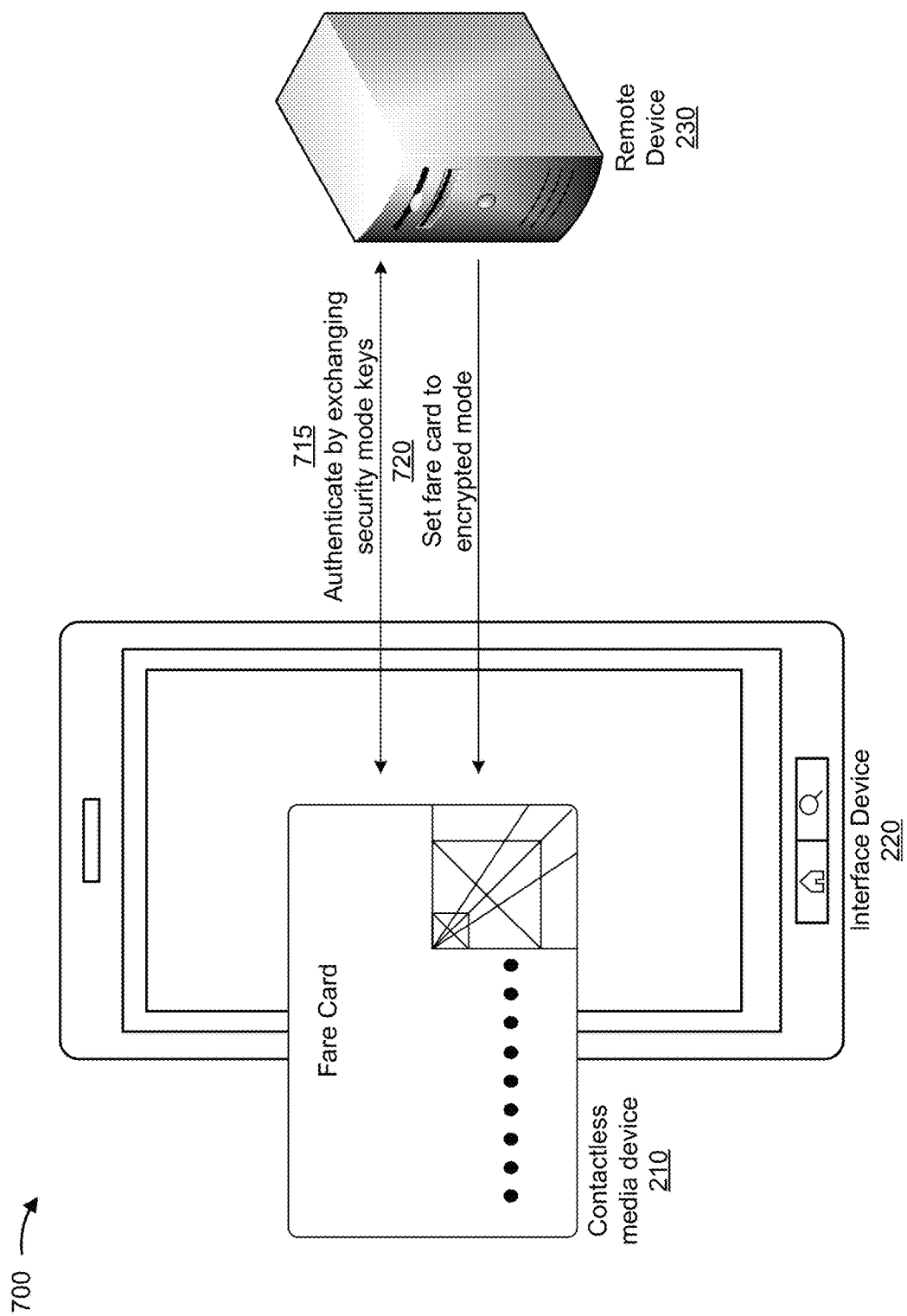

As shown in FIG. 7B, and by reference number 715, the fare card and remote device 230 authenticate one another by exchanging security mode keys via interface device 220. As shown by reference number 720, remote device 230 sends an instruction that causes the fare card to set a security mode to an encrypted mode. Because the devices have authenticated one another, the fare card accepts the instruction and sets the security mode to the encrypted mode.

Figure 7C:
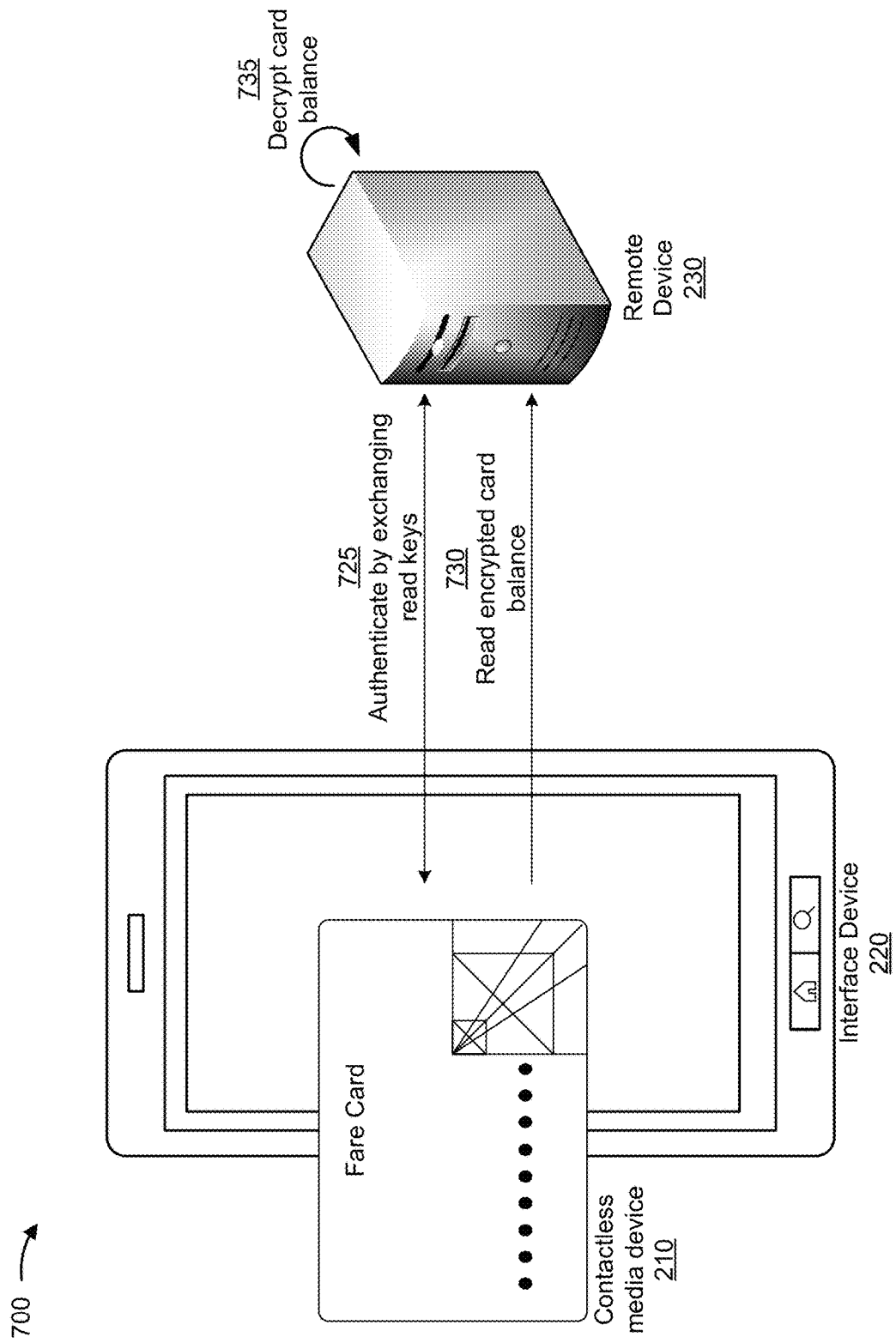

As shown in FIG. 7C, and by reference number 725, the fare card and remote device 230 authenticate one another by exchanging read keys via interface device 220. As shown by reference number 730, remote device 230 reads an encrypted card balance received from the fare card. For example, remote device 230 may request the encrypted card balance. Because the devices have authenticated one another, the fare card responds to the request by encrypting the card balance (based on being in the encrypted mode) and sending the encrypted card balance to remote device 230. As shown by reference number 735, remote device 230 decrypts the card balance.

Figure 7D:
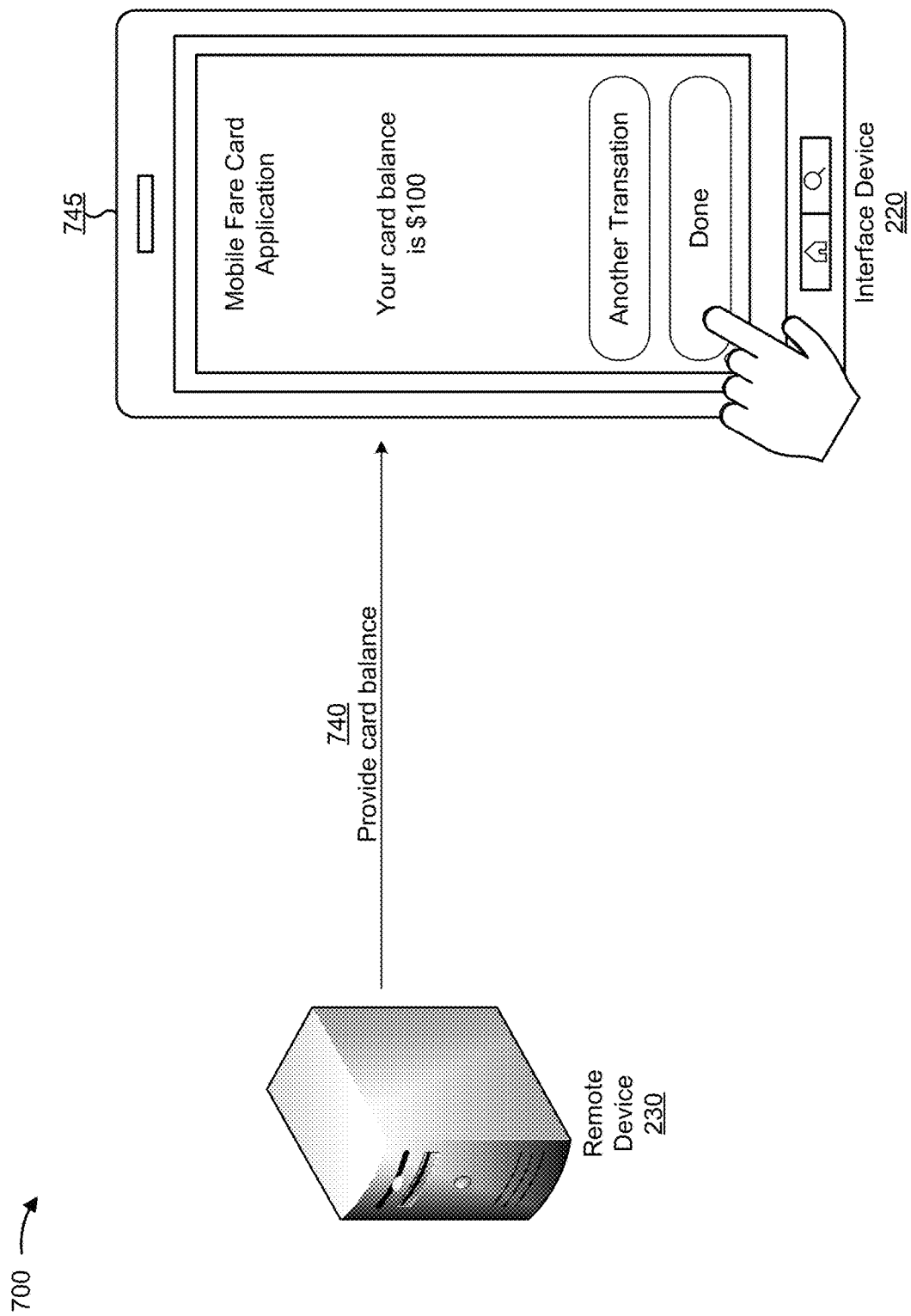

As shown in FIG. 7D, and by reference number 740, remote device 230 provides the card balance to interface device 220. In some implementations, remote device 230 may separately secure (e.g., encrypt, encoded, etc.) the card balance when sending the card balance to interface device 220 (e.g., using the same read key, using a different key, etc.). As shown by reference number 745, interface device 220 receives the card balance, and provides the card balance for display to the user. In this way, interface device 220 may securely provide the card balance with reduced risk that the card balance is intercepted by a third party attacker device.

Figure 7E:
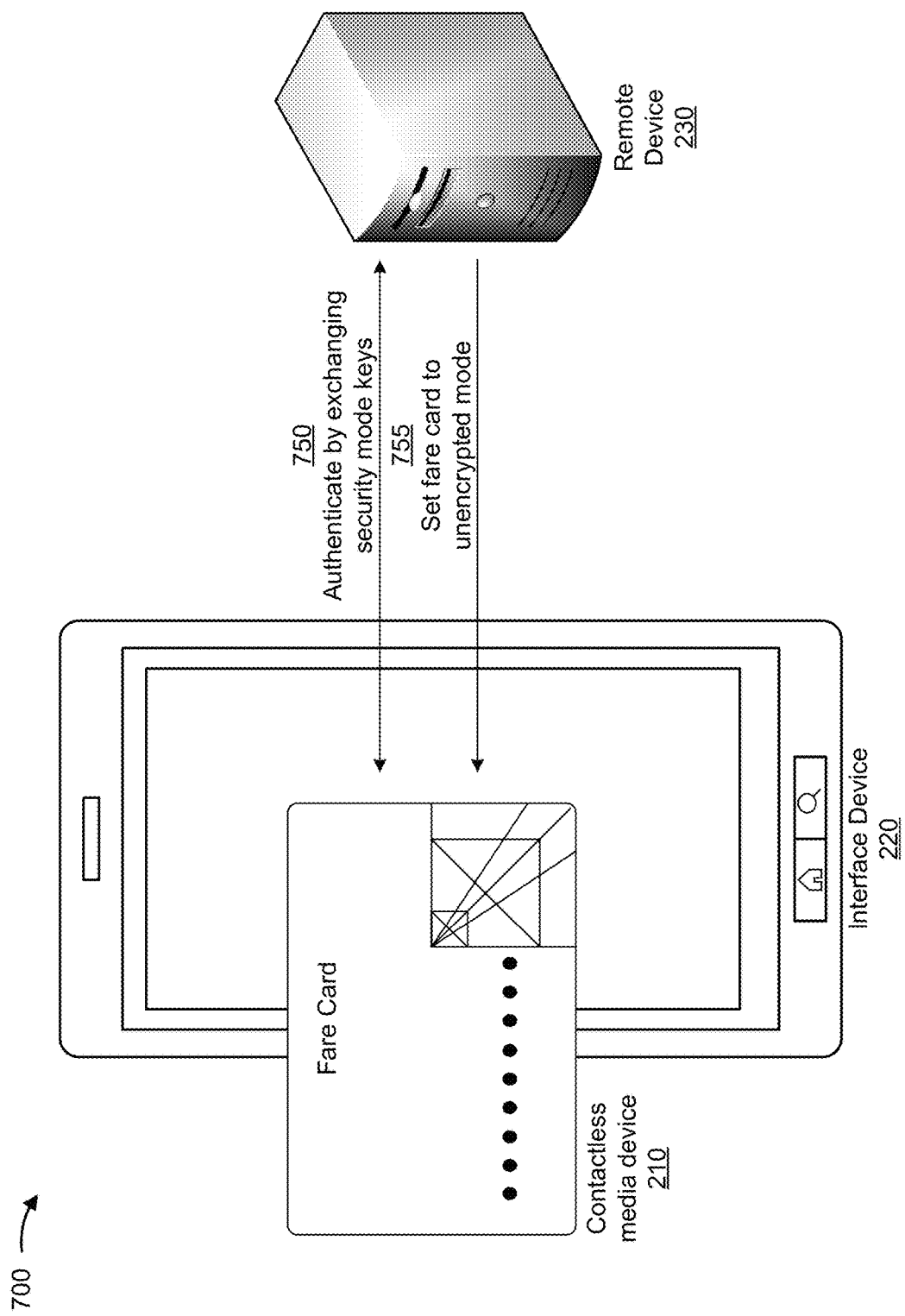

As shown in FIG. 7E, and by reference number 750, the fare card and remote device 230 again authenticate one another by exchanging the security mode keys via interface device 220. As shown by reference number 755, remote device 230 sends an instruction that causes the fare card to set a security mode to an unencrypted mode. Because the devices have authenticated one another, the fare card accepts the instruction and sets the security mode to the unencrypted mode. In some implementations, remote device 230 may verify that the fare card has been set to the unencrypted mode by reading plaintext information from the fare card. In this way, remote device 230 may be used to facilitate secure transactions with the fare card via a contactless interface of interface device 220. In some implementations, authentication may only be required when changing the security mode from the high security mode to the low security mode, and may not be required when changing from the low security mode to the high security mode.

As indicated above, FIGS. 7A-7E are provided merely as an example. Other examples are possible and may differ from what was described with regard to FIGS. 7A-7E.

FIGS. 8A-8F are diagrams of another example implementation 800 relating to example process 400 shown in FIG. 4. FIGS. 8A-8F show an example of facilitating secure transactions using a contactless interface.

Figure 8A:
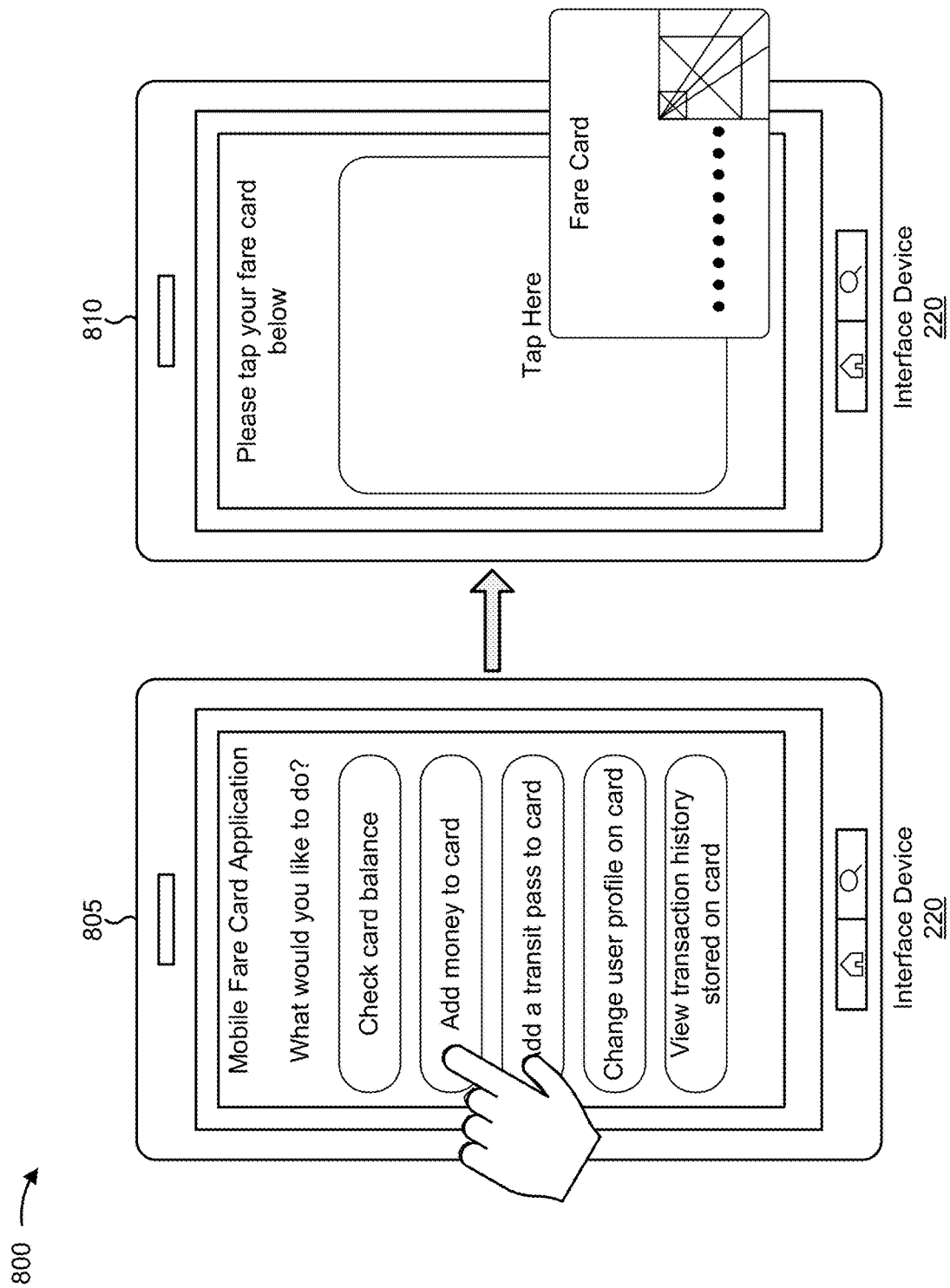
FIGS. 8A-8F are diagrams of another example implementation relating to the example process shown in FIG. 4.

As shown in FIG. 8A, and by reference number 805, assume that a user interacts with interface device 220, shown as a mobile phone. Assume that interface device 220 executes a mobile fare card application that permits the user to perform transactions associated with a fare card (e.g., a contactless media device 210), such as checking a card balance, adding money to the fare card, adding a transit pass to the fare card, changing a user profile stored on the fare card, viewing a transaction history stored on the fare card, or the like. As shown, the user selects to add money to the fare card. As shown by reference number 810, based on the user selection, assume that the mobile fare card application prompts the user to tap the user's fare card on interface device 220, to bring the fare card within communicative proximity of interface device 220. As shown, assume that the user brings the fare card within communicative proximity of interface device 220, such that the devices are able to communicate (e.g., via an NFC communication session).

Figure 8B:
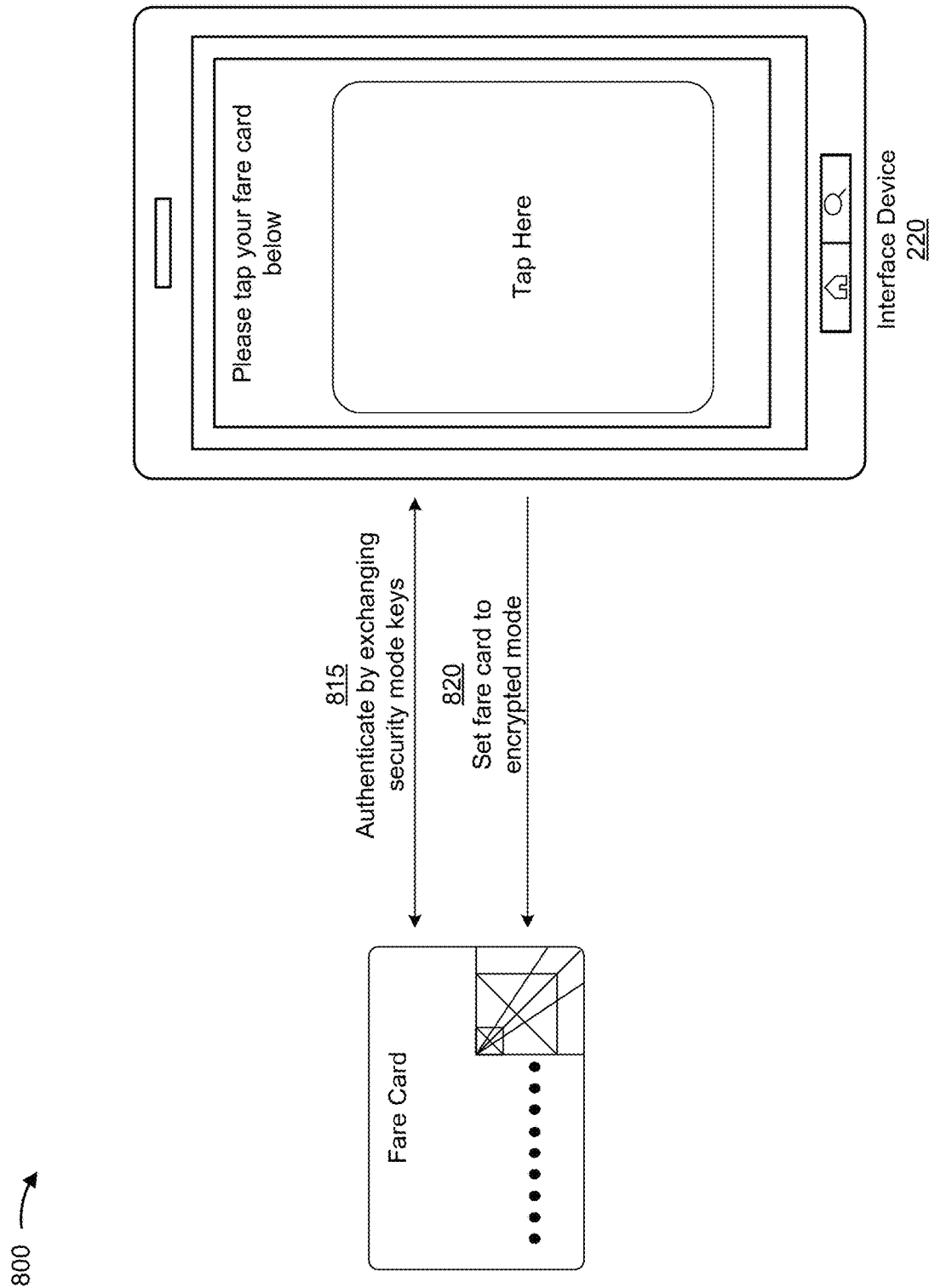

As shown in FIG. 8B, and by reference number 815, the fare card and interface device 220 authenticate one another by exchanging security mode keys. As shown by reference number 820, interface device 220 sends an instruction that causes the fare card to set a security mode to an encrypted mode. Because the devices have authenticated one another, the fare card accepts the instruction and sets the security mode to the encrypted mode.

Figure 8C:
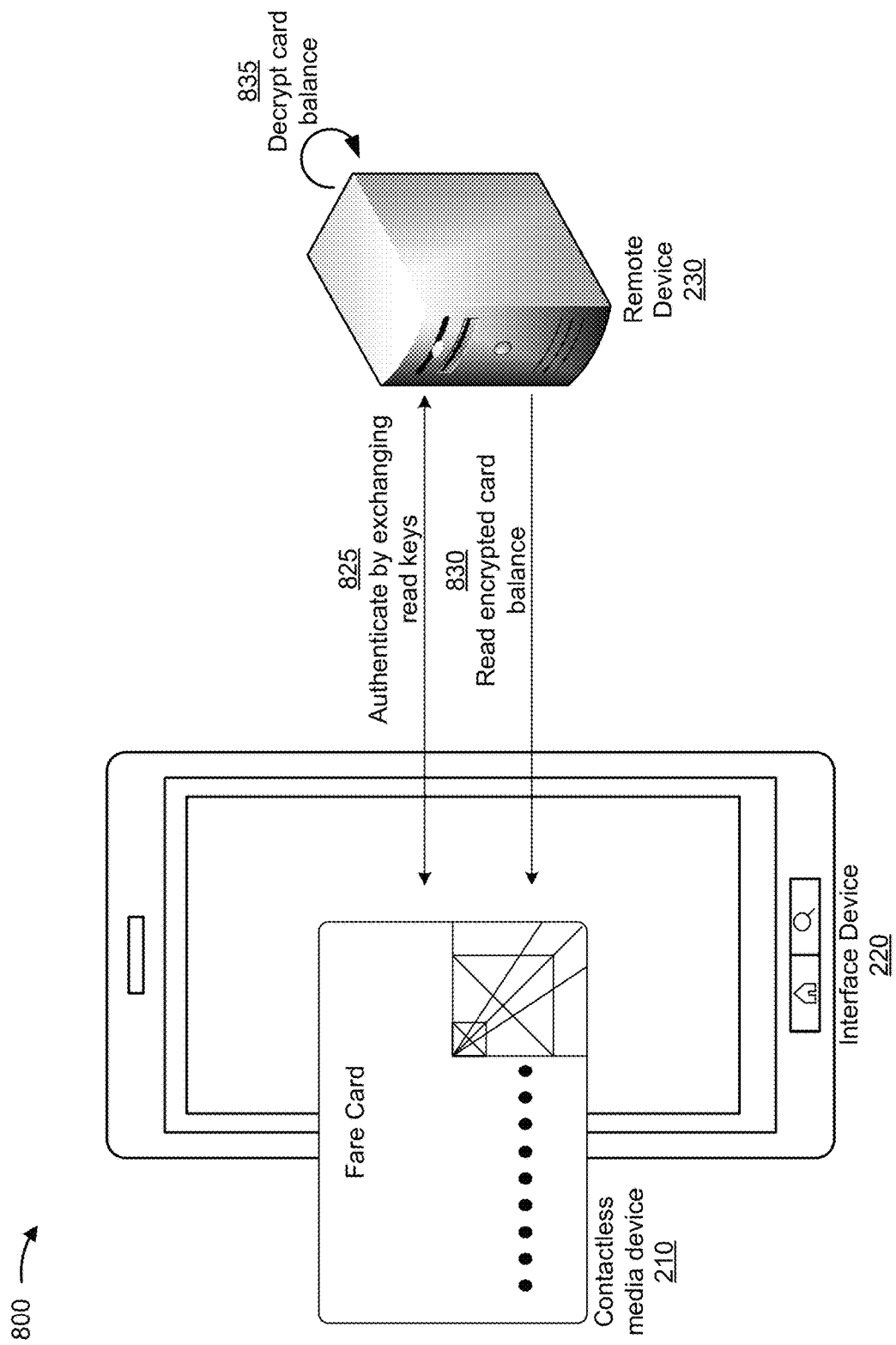

As shown in FIG. 8C, and by reference number 825, the fare card and remote device 230 authenticate one another by exchanging read keys via interface device 220. As shown by reference number 830, remote device 230 reads an encrypted card balance received from the fare card. For example, remote device 230 may request the encrypted card balance. Because the devices have authenticated one another, the fare card responds to the request by encrypting the card balance (based on being in the encrypted mode) and sending the encrypted card balance to remote device 230. As shown by reference number 835, remote device 230 decrypts the card balance.

Figure 8D:
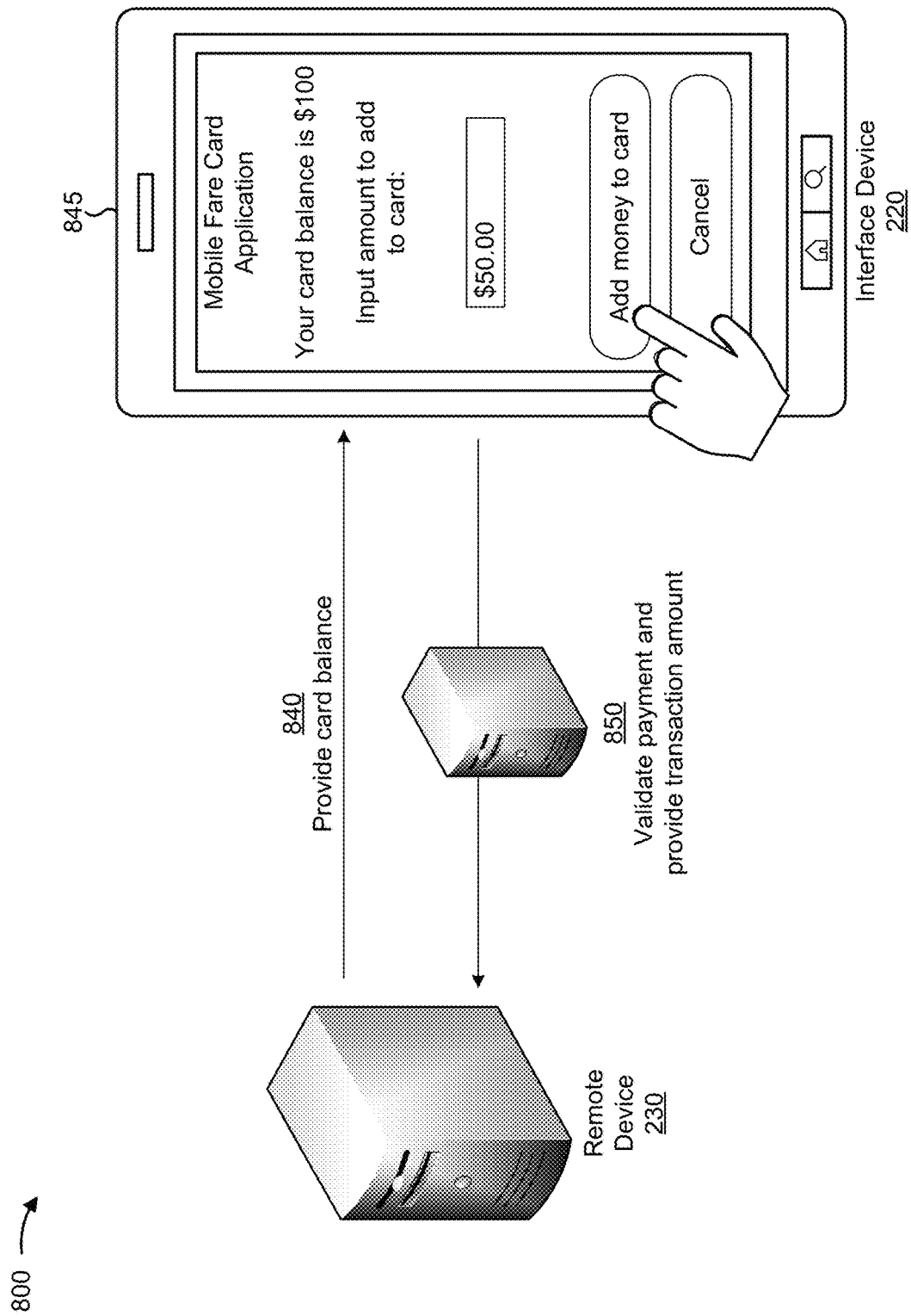

As shown in FIG. 8D, and by reference number 840, remote device 230 provides the card balance to interface device 220. As shown by reference number 845, interface device 220 receives the card balance, provides the card balance for display to the user, and prompts the user to input an amount of money to add to the fare card. As shown by reference number 850, assume that the payment is validated (e.g., by remote device 230 or another device, such as a payment authentication server), and the amount of the transaction (e.g., $50.00) is provided to remote device 230.

Figure 8E:
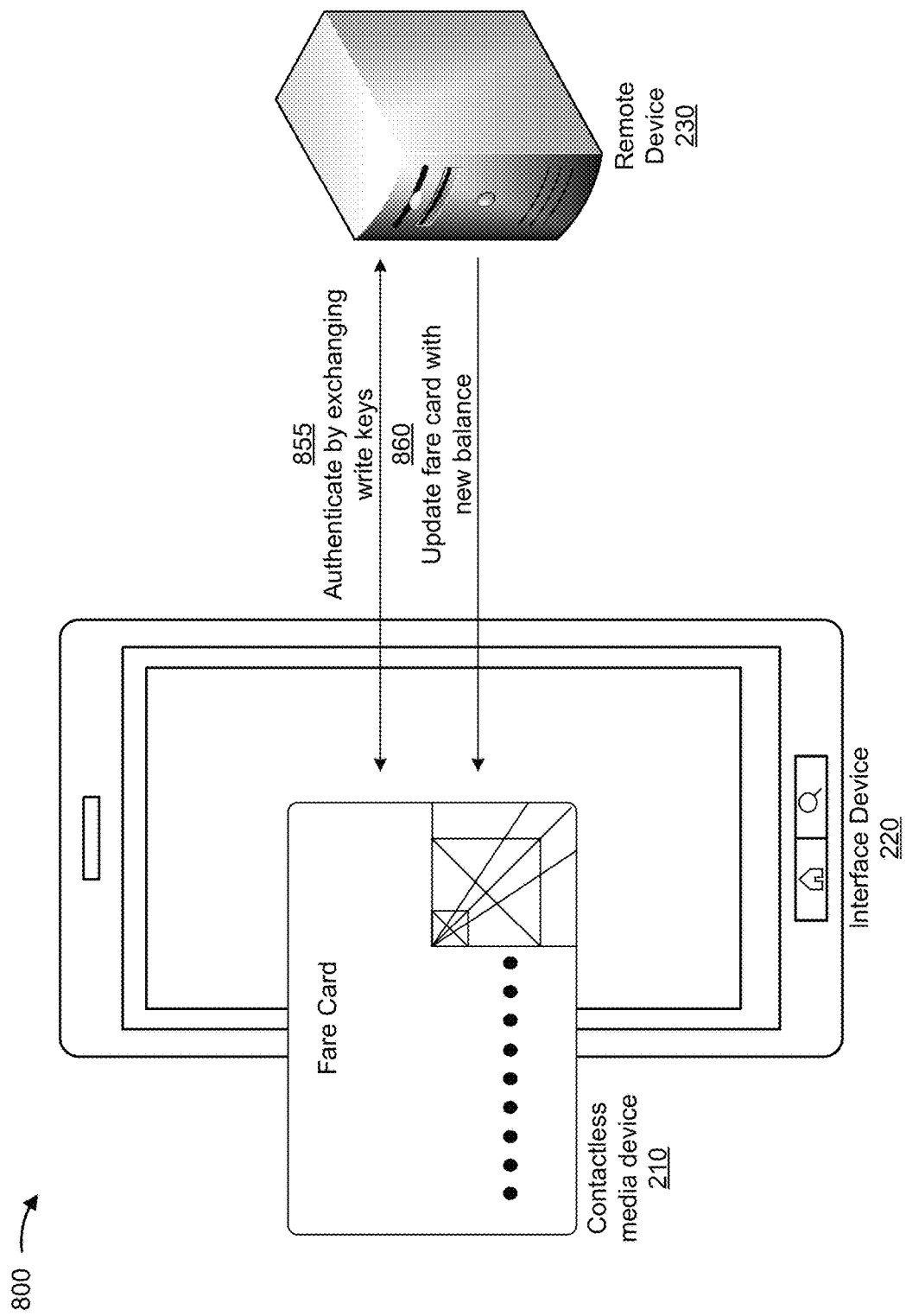

As shown in FIG. 8E, and by reference number 855, the fare card and remote device 230 authenticate one another by exchanging write keys via interface device 220. As shown by reference number 860, remote device 230 writes an updated card balance to the fare card. For example, remote device 230 may provide the updated card balance to the fare card, and may provide an instruction to update the card balance stored by the fare card. Because the devices have authenticated one another, the fare card updates the stored card balance.

Figure 8F:
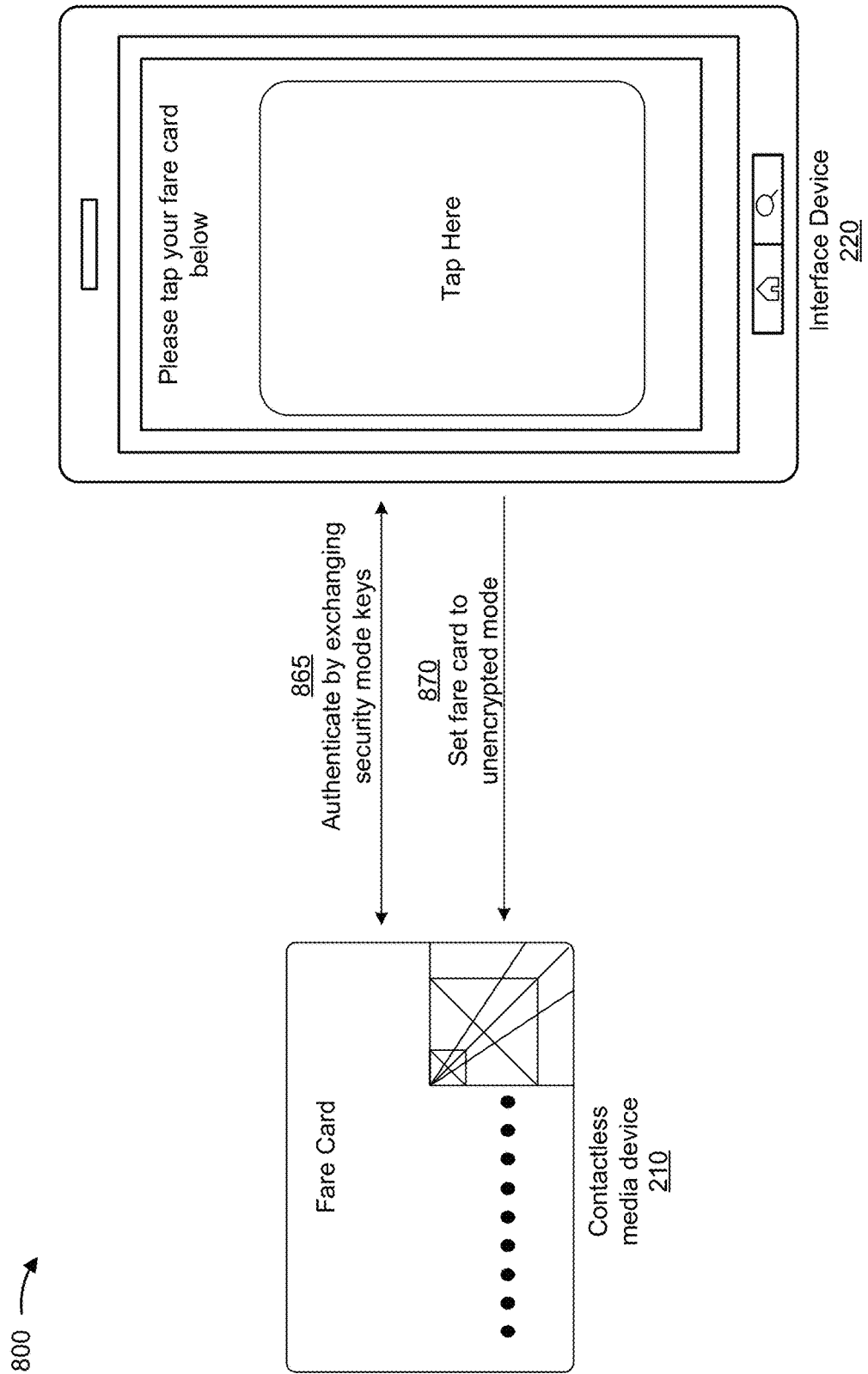

As shown in FIG. 8F, and by reference number 865, the fare card and interface device 220 again authenticate one another by exchanging the security mode keys. As shown by reference number 870, interface device 220 sends an instruction that causes the fare card to set a security mode to an unencrypted mode. Because the devices have authenticated one another, the fare card accepts the instruction and sets the security mode to the unencrypted mode. In some implementations, interface device 220 may verify that the fare card has been set to the unencrypted mode by reading plaintext information from the fare card. In this way, interface device 220 may be used to facilitate secure transactions with the fare card via a contactless interface of interface device 220.

As indicated above, FIGS. 8A-8F are provided merely as an example. Other examples are possible and may differ from what was described with regard to FIGS. 8A-8F.

Implementations described herein facilitate secure communications between contactless media devices and interface devices, and/or between contactless media devices and remote devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors configured to:
perform a first authentication operation, associated with a contactless media device, using a security mode key by communicating with the contactless media device via an interface device after the contactless media device is brought within communicative proximity of the interface device,
the contactless media device including one of:
a smart card,
an identification card,
a fare card,
an access card, or
a wireless key fob, and
the interface device including one of:
a mobile phone, or
a tablet computer;
set a security mode of the contactless media device to a first security mode based on performing the first authentication operation;
establish a secure communication channel with the contactless media device based on the first security mode;
perform a second authentication operation, associated with the contactless media device, using a transaction key,
the transaction key being different from the security mode key;
read, via the secure communication channel, secured information from the contactless media device based on performing the second authentication operation;
validate that the secured information has been read from the contactless media device;
decrypt the secured information, read from the contactless media device, to obtain particular information;
provide the particular information to the interface device for display;
set, after validating that the secured information has been read from the contactless media device, the security mode to a second security mode based on the validating; and
establish an unsecure communication channel with the contactless media device based on the second security mode.

2. The device of claim 1, where the one or more processors, when setting the security mode to the first security mode, are to:
provide an instruction that causes the contactless media device to encrypt or encode the secured information.

3. The device of claim 1,
where the device is located remotely from the contactless media device and communicates with the contactless media device via the interface device, and
where the interface device communicates with the contactless media device via a contactless interface.

4. The device of claim 1, where the one or more processors are further to:
read unsecured information stored by the contactless media device; and validate that the contactless media device has set the security mode to the second security mode based on the unsecured information.

5. The device of claim 4, where the unsecured information is in a plaintext format.

6. The device of claim 4, where the one or more processors are further to:
receive a request to read information from the contactless media device before performing the first authentication operation.

7. The device of claim 1, where the transaction key includes:
a key that permits the device to read the secured information stored by the contactless media device.

8. A computer-readable medium storing instructions, the instructions comprising:
one or more instructions that, when executed by one or more processors, cause the one or more processors to:
perform a first authentication operation, associated with a contactless media device, using a first key by communicating with the contactless media device via an interface device after the contactless media device is brought within communicative proximity of the interface device,
the first key permitting a security mode of the contactless media device to be modified,
the contactless media device including one of:
a smart card,
an identification card,
a fare card,
an access card, or
a wireless key fob, and
the interface device including one of:
a mobile phone, or
a tablet computer;
set the security mode based on performing the first authentication operation,
the first security mode causing the contactless media device to secure at least one transmission from the contactless media device;
establish a secure communication channel with the contactless media device based on the first security mode;
perform a second authentication operation, associated with the contactless media device, using a second key,
the second key permitting information to be read from or written to the contactless media device;
read, via the secure communication channel, secured information from the contactless media device based on performing the second authentication operation;
decrypt the secured information, read from the contactless media device, to obtain particular information;
provide the particular information to the interface device for display; and
establish an unsecure communication channel with the contactless media device based on a second security mode.

9. The computer-readable medium of claim 8, where the one or more instructions, when executed by the one or more processors, further cause the one or more processors to:
validate that the secured information has been read from the contactless media device; and
set, after validating that that secured information has been read from the contactless media device, the security mode to the second security mode,
the second security mode preventing the contactless media device from securing at least one transmission from the contactless media device.

10. The computer-readable medium of claim 9,
where the first security mode causes the contactless media device to encrypt or encode transmissions; and/or
where the second security mode prevents the contactless media device from encrypting or encoding transmissions.

11. The computer-readable medium of claim 8, where the one or more instructions, when executed by the one or more processors, further cause the one or more processors to:
perform a third authentication operation, associated with the contactless media device, using at least one of:
the second key, or
a third key that is different from the first key and the second key; and
set the security mode to a second security mode based on performing the third authentication operation.

12. The computer-readable medium of claim 8, where the second key is different from the first key.

13. The computer-readable medium of claim 8, where the one or more instructions, that cause the one or more processors to read the secured information, cause the one or more processors to at least one of:
read a card balance stored by the contactless media device,
read a transit pass stored by the contactless media device,
read profile information stored by the contactless media device,
read a transaction history stored by the contactless media device, or
read access rights stored by the contactless media device.

14. The computer-readable medium of claim 8, where the particular information includes information identifying a balance of an account.

15. A method, comprising:
performing a first authentication operation, associated with a contactless media device, using a first key by communicating with the contactless media device via an interface device after the contactless media device is brought within communicative proximity of the interface device,
the first key permitting a security mode of the contactless media device to be modified,
the contactless media device including one of:
a smart card,
an identification card,
a fare card,
an access card, or
a wireless key fob, and
the interface device including one of:
a mobile phone, or
a tablet computer;
setting, by the first device, the security mode to a first security mode based on performing the first authentication operation,
the first security mode causing the contactless media device to secure at least one transmission from the contactless media device;
establishing, by the first device, a secure communication channel with the contactless media device based on the first security mode;
performing, by the first device, a second authentication operation, associated with the contactless media device, using a second key, the second key permitting information to be read from or written to the contactless media device;

reading, by the first device and via the secure communication channel, secured information from the contactless media device based on performing the second authentication operation;

decrypting, by the first device, the secured information, read from the contactless media device, to obtain particular information;

provide, by the first device, the particular information to the interface device for display; and establishing, by the first device, an unsecure communication channel with the contactless media device based on a second security mode.

16. The method of claim 15, where the interface device interfaces with the contactless media device via a contactless interface.

17. The method of claim 15, further comprising:

validating that the secured information has been read from the contactless media device; and setting, after validating that that secured information has been read from the contactless media device or that the secure information has been written to the contactless media device, the security mode to the second security mode, the second security mode causing the contactless media device to provide less secure transmissions than transmissions sent using the first security mode.

18. The method of claim 15, where the first security mode causes the contactless media device to encrypt or encode the secured information.

19. The method of claim 15, further comprising:

performing a third authentication operation, associated with the contactless media device, using the second key; and setting the security mode to a second security mode based on performing the third authentication operation, the second security mode being different from the first security mode.

20. The method of claim 15, further comprising:

receiving, from a second device, a request to read information from or write information to the contactless media device, where performing the first authentication operation further comprises:

performing the first authentication operation based on receiving the request.

\* \* \* \* \*

UNITED STATES PATENT AND TRADEMARK OFFICE
CERTIFICATE OF CORRECTION

Page 1 of 1

PATENT NO. : 10,657,519 B2
APPLICATION NO. : 14/777911
DATED : May 19, 2020
INVENTOR(S) : Avishek Somani et al.

It is certified that error appears in the above-identified patent and that said Letters Patent is hereby corrected as shown below:

In the Claims

Claim 8: Column 19, Line 37 "set the security mode based on performing the first" should be changed to - set the security mode to a first security mode based on performing the first -

Claim 15: Column 20, Line 39 "performing a first authentication operation, associated" should be changed to - performing, by a first device, a first authentication operation, associated -

Claim 15: Column 21, Lines 1 and 2 "the second key permitting information to be read from or written to the countactless media device;" should be changed to - the second key permitting the first device to read from or write to the contactless media device -

Claim 15: Column 21, Line 9 "provide, by the first device, the particular information to" should be changed to - providing, by the first device, the particular information to -

Claim 17: Column 21, Line 19 "the contactless media device; and" should be changed to - or written to the contactless media device; and -

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*